United States Patent [19]
Arias et al.

[11] Patent Number: 6,118,976
[45] Date of Patent: Sep. 12, 2000

[54] ASYMMETRIC DATA COMMUNICATIONS SYSTEM

[75] Inventors: Salvador Luis Arias, Chamblee; Edward Irby Comer, Marietta; Roy Curtis Dunn, Douglasville; Melvin Duane Frerking, Norcross; Fred Thomas Danner, III, Alpharetta; Richard Sammis Bergen, Jr., Roswell; Sidney Walker Elliott, Atlanta; Thomas Franklin Evans, Stone Mountain; Craig Brent Chambers, Stockbridge, all of Ga.

[73] Assignee: BellSouth Intellectual Property Corporation, Wilmington, Del.

[21] Appl. No.: 08/994,531

[22] Filed: Dec. 19, 1997

Related U.S. Application Data

[63] Continuation of application No. 08/447,537, May 24, 1995, abandoned.

[51] Int. Cl.[7] ...................................................... H04N 7/173
[52] U.S. Cl. .................................. 455/5.1; 348/12; 348/7
[58] Field of Search .............................. 345/327; 348/12, 348/13, 7, 6; 455/4.2, 5.1, 3.1, 6.1; H04N 7/16, 7/173

[56] References Cited

U.S. PATENT DOCUMENTS 4,747,160  5/1988  Bossard .
5,563,892  10/1996  Kostreski et al. ........................ 370/69
5,600,364  2/1997  Hendricks et al. .......................... 348/1
5,668,610  9/1997  Bossard et al. .

*Primary Examiner*—Chris Grant
*Attorney, Agent, or Firm*—James L. Ewing, IV; Geoff L. Sutcliffe; Kilpatrick Stockton LLP

[57] ABSTRACT

An asymmetrical data communications system (ADCS) provides point-to-multipoint television programming including conventional television programming, near video-on-demand (NVoD) or video-on-demand (VoD), and the full variety of available programming, via a compressed, digitized UHF transmission. A program subsystem of the ADCS receives programming from content providers and processes the received signals for channel and VoD or NVoD service, then sends the aggregated signal to a transmission subsystem that modulates, channelizes, amplifies, filters and broadcasts the digital UHF signals over the air. Subscribing viewers are equipped with an intelligent control box (ICB) suitably configured to receive, demodulate, and decode the digital UHF broadcast and to transmit the resulting signal to one or more display or other terminal devices. The ICB further provides a matrix switch or gateway for receiving signals over any available transmission path. In addition to the ICBs of the subscribing viewers, a return path subsystem of the ADCS system includes a session control and administrative facility to which the ICBs are linked via the public switched telephone network or suitable wireless alternative so that transaction and viewing data can be received from the subscribing viewers. The return path subsystem, in turn, is linked to the program subsystem in order to route to that subsystem any information necessary or useful for providing programming.

31 Claims, 9 Drawing Sheets

ASYMMETRIC DATA COMMUNICATIONS SYSTEM

RELATED APPLICATIONS

This application is a continuation of Ser. No. 08/447,537, filed May 24, 1995, now abandoned.

FIELD OF THE INVENTION

The present invention relates in general to the field of data communications, and in particular, to the fields of television and telecommunications.

BACKGROUND OF THE INVENTION

Originally, television programming was provided solely by over-the-air broadcast. The most widely received over-the-air transmissions were and continue to be in the very high frequency (VHF) band and only to a much more limited extent in the ultra high frequency (UHF) band of the RF spectrum. In recent decades, however, the delivery of television programming into the home increasingly has been delivered via CATV (cable) service. CATV transmission offered considerably higher bandwidth than was available over-the-air, while the quality of its transmission—for those equipped with the necessary coaxial cable for receiving the analog signal, and the hardware required for descrambling it—has been generally better than analog airwave transmission, which is subject to a variety of forms of signal interference.

The high bandwidth and transmitted signal quality of CATV transmission relative to over-the-air broadcasting has led to CATV being a dominant force in the market for multiple channel programming. That CATV coaxial delivery systems in principle provide sufficient bandwidth to permit two way communication with subscribers has fueled speculation that CATV may provide an early venue for the provision of interactive television services. CATV service, however, is inherently limited by the extent of its geographic penetration. CATV service is simply unavailable in locations that cable providers have chosen not to serve. Even where CATV service is available, installation of the coaxial cable is disruptive as well as expensive.

The provision of interactive programming content has become a major goal of the converging television, entertainment, programming, telecommunications, on line and computing industries. Telecommunications companies, for example, have invested significant resources in developing "video dialtone," in which programming services would be provided by way of the telephone system. Although this approach shows enormous potential and the ability to revolutionize both the telecommunications and television industries, it presents certain non-trivial technological and economic problems. The provision of video dialtone services to the home may turn on the installation of optical fiber and/or coaxial cable in place of existing twisted pair telephone connections, which presents a highly expensive and time consuming proposition that is not expected to be implemented for some time.

Aside from efforts to move to what has become known as high-definition television (HDTV), and to provide such HDTV services over the air, comparatively little attention has been paid recently to enhancing television programming services that are delivered over the airwaves. A possible reason for the comparative lack of effort may be that the perceived need to support interactivity would seem to militate against a video delivery system that uses as its transport medium one that apparently lacks a return path. The available choices for delivery of television programming, meanwhile, have continued to grow into such areas as "wireless cable" and direct broadcast satellite, tending to draw attention even further away from over-the-air broadcasting.

Another factor barring or at least complicating any attempt to provide enhanced television service over-the-air is imposed by existing federal communications regulations, set forth in Title 47 of the United States Code of Federal Regulations. These regulations establish a framework for the delivery of programming over-the-air that is as rigid as it is highly detailed, and that, short of legislation, is subject to modification only by the Federal Communications Commission, and then only within the mechanism provided by the Administrative Procedures Act, 5 U.S.C. §§551–559, §§701–706, §1305, §3105, §3344, §5372, §7521.

Still another obstacle to the provision of an alternative means for providing programming services on a large scale, such as by over-the-air broadcast, has to do with equipping intended recipients of the programming services with the means to receive and view the programming. Aside from the direct expense associated with providing a new device, viewers may harbor concerns about the compatibility of a new in-home device with any existing premises equipment, in which a viewer may have made a sizable investment. Even if a device were to be provided gratis by a service provider, for example, subscribers may be somewhat reluctant to commit to a particular system if it were not compatible with existing delivery systems purely for reasons having to do with such things as clutter and the consumption of available space. Nevertheless, the apparent demand not only for traditional television programming, but also for such services as home shopping, video games, data services such as electronic catalogs, stock market quotations, sports scores, and electronic newspapers, as well as interactive services and video on demand (VoD) or near video on demand (NVoD) continues to grow. This consumer demand, coupled with an increased demand by marketing organizations for demographic and consumer preference information for use in their characterizing and targeting the increasingly segmented consumer populace faced with a growing number of viewing alternatives makes clear that any alternative means for delivering programming must have a return path for enabling viewer interaction.

SUMMARY OF THE INVENTION

The system, method and device according to the present invention solves the problems described above by providing an asymmetric data communications system (ADCS) capable of furnishing an alternative to conventional over-the-air and CATV television transmission, and that is also capable of providing functionality not furnished by either of those delivery systems. The system according to the present invention provides an alternative means for the delivery of video and audio entertainment programming, as well as a variety of data services, such as electronic catalogs, stock market quotations, sports scores, electronic newspapers, and will be able to carry services that have not yet been conceptualized. The ADCS system of the present invention at the same time provides a return path capable of supporting viewer interactivity, enabling the viewer to request transactions and orders for services that require authorization, to engage in interactive participation in programming distributed on a programming channel and other forms of interaction, as well as providing a data path and a mechanism for gathering demographic information from subscribers.

A first aspect of the system according to the present invention makes available previously unusable over-the-air broadcasting spectrum. Briefly, and as described at length below, the system according to the present invention digitizes, compresses and modulates signals for transmission in the UHF spectrum band that is currently assigned to television broadcasters, the signal compression using presently available techniques to achieve eight or more times the capacity using conventional techniques as can now be carried in that band. The ADCS system according to the present invention thereby provides point-to-multipoint multichannel broadcast services over-the-air on a scale previously available only using cable, and does so with high quality transmission and reception, and without interfering with existing channels broadcasting under the NTSC (National Television System Committee), PAL (Phase Alternation Line), SECAM (Sequential Couleur A Memoire), or other color television transmission standard. In addition, a program subsystem of the present invention aggregates heterogenous programming from a number of content providers for digital UHF transmission, as well as VoD and NVoD, both services being provided only upon completion of an authorization function.

The system according to the present invention provides an alternative to CATV for those who wish to subscribe to services that have previously been considered the exclusive province of CATV. Notably, subscribers dissatisfied with CATV services or who simply are not served by CATV will be able to gain access to a large number of channels and at a considerably lesser expense, since the below-described system will enable program providers to offer the point-to-multipoint broadcasting at a cost lower than that associated with that of the installed cable system base. Subscribers will be able to receive and participate in interactive television without the need for a cable connection. Such subscribers will simply need a suitable device, referred to herein as an intelligent control box (ICB) and described in detail below.

According to the present invention, the ICB is adapted not only to receive, decompress, decode and transmit for display the received digitized UHF signals, but also to provide a terminal capable of establishing a return path to the broadcaster via the public switched telephone network (PSTN) (e.g., POTS, ISDN, ADSL, B-ISDN) or a suitable wireless alternative. The ICB serves as an electronic gatekeeper, providing matrix switch functionality to interface between the ADCS and a consumer television, computer or any suitable monitor or terminal device. As further described below, the ICB can include transmission decoding functionality, data storage, switching and authorization functions. The ICB can also include a capability for switching between a variety of non-ADCS inbound or downstream sources, including conventional "over-the-air" television, CATV, MMDS (multipoint microwave distribution system, or "wireless cable"), DBS ("direct broadcast satellite"), LMDS ("local multipoint distribution system," provided, e.g., by CellularVision), VCRs, computer/video games, and mass storage devices.

A final part of an ADCS system according to the present invention is a return path facility which, along with ICBs to which it is linked by the PSTN or wireless alternative, constitutes the return path subsystem of the ADCS system according to the present invention.

Accordingly, it is an object of the present invention to provide an alternative to conventional wired cable television (CATV).

It is another object of the present invention to provide this alternative to conventional wired cable television in the form of an over-the-air radio frequency (RF) point-to-multipoint broadcast and receiving system.

It is a further object of the present invention to provide an alternative to conventional wired cable television that includes a return path by way of which user transactions, orders, demographics and other information may be sent or collected from a subscriber premises device.

It is yet another object of the present invention to provide the return path in the form of a wired point-to-point configuration, such as a configuration using switched (analog or digital) telephone technology, that in the context of a digital UHF point-to-multipoint broadcast system provides an asymmetrical data communications system.

It is another object of the present invention to provide an ADCS having a program subsystem capable of aggregating a variety of heterogeneous programming, digitizing and compressing these signals for UHF broadcast.

Another object of the present invention is to provide an ADCS having a return path facility accessed by subscribers over a public telecommunications network for capturing and fulfilling program requests and other transactions and also for collecting subscriber demographics information.

It is still a further object of the present invention to provide an intelligent control box to act as an electronic gate keeper at the subscriber's presence in the form of a matrix switch capable of providing an interface, capable of receiving and decoding a digital RF transmission in the UHF band, and communicating subscriber messages to the ADCS.

DETAILED DESCRIPTION OF THE INVENTION

Figure 1:
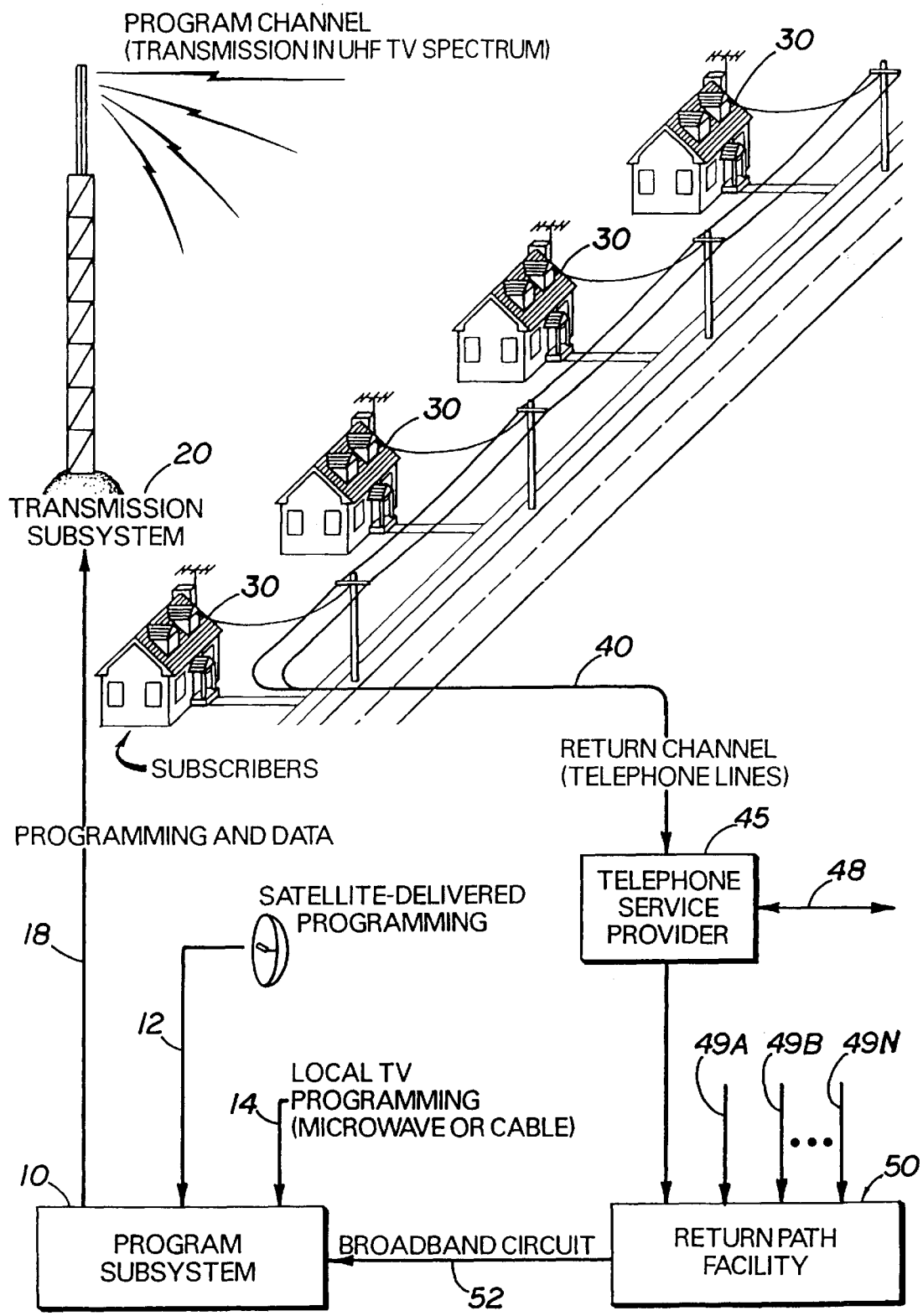
FIG. 1 is a schematic view of an embodiment of an asymmetrical data communications system according to the present invention.

The system and components of the system according to the present invention will be described with reference to the accompanying figures, and in an order that reflects the delivery of services to consumers. A high-level view of an embodiment of the system according to the present invention is provided in FIG. 1. As shown, a program subsystem 10 is equipped to receive content from various sources, including: non-local content providers 12 via satellite or any other suitable means or transmission path (including optical fiber, for example); from local TV programming entities 14 via microwave, optical fiber, cable, or other suitable transmission paths; or over any suitable path from any other source (not shown). The received content may include conventional channel television broadcasts, home shopping, data services, electronic catalogs stock market quotations, sports scores, electronic newspapers and other content, whether or not presently available. Video-on-demand (VoD) or near video-on-demand (NVoD) may also be received by any known means and provided by conventional video servers, as described at greater length below.

Program subsystem 10 collects and processes the signals from these various sources and, after processing the signals, provides the programming, data and any other received content in an appropriate form and over a suitable data link 18 to a transmitter subsystem or site 20.

Transmitter subsystem 20 includes transmission equipment, described in detail below, for generating a signal having sufficient effective radiated power (ERP) and signal-to-noise ratio (SNR) to reach a set of intended subscribers 30 with acceptably high quality reception. In the preferred embodiment of the present invention, program subsystem 10 and transmitter subsystem 20 transmit this combined content in digital form and in the ultra high frequency (UHF) band of the RF spectrum (407–806 MHz).

Subscribers 30 each are equipped at their premises with appropriate receiving and processing equipment (not shown in this view, but described in detail below). Using this equipment, subscribers 30 can select from among the variety of content carried by the signal(s) transmitted by the equipment at transmission site 20, as well as from among the full array of other programming sources as to which the premises equipment acts as an electronic gateway. Communications from subscribers 30 can include requests for VoD, NVoD, or other interactive or non-interactive program service, and can also include marketing information regarding subscriber 30. Messages from (or about) subscriber 30 are transmitted via switched telephone technology, i.e., the public switched telephone network (PSTN) lines 40 (or a suitable wireless alternative, not shown) and via switching and other service sites maintained and operated by a local telephone service provider 45, to a return path facility 50 (which may also be operated by a telephone service provider, BellSouth Corp., for example).

Return path facility 50 may also undertake transactions with other service providers (collectively identified by reference numeral 48). Return path facility 50 also receives communications from other subscribers (via lines 49A, 49B, . . . , 49N), and performs a variety of functions including the control of sessions with subscribers 30 and conducting administrative functions, both of which will be discussed in detail below. Finally, return path facility 50 communicates authorization requests to program subsystem 10 via a high capacity data link 52, such as a broadband circuit or other high capacity link.

Figure 2:
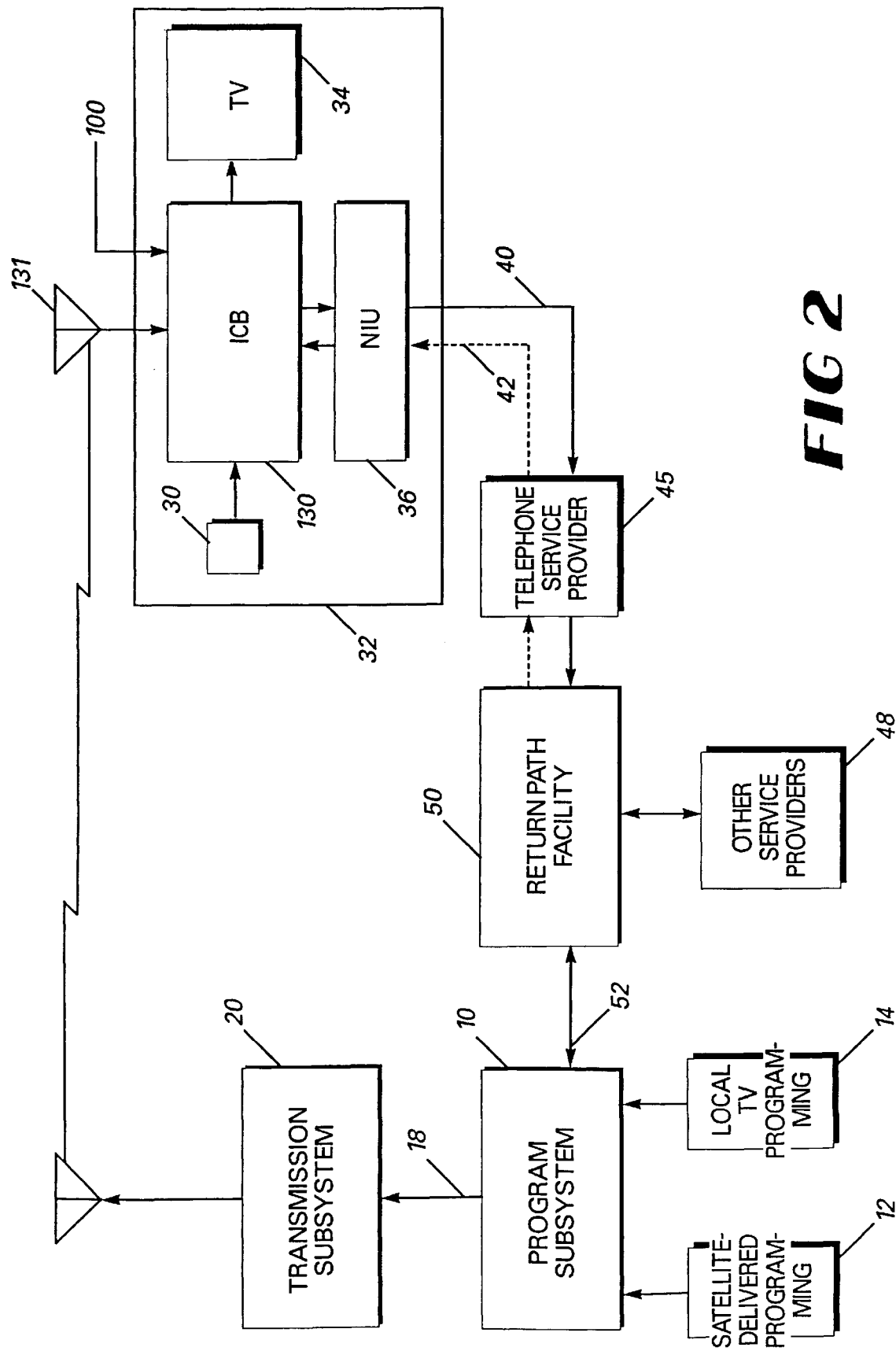
FIG. 2 is a component block diagram of the components of an embodiment of an asymmetrical data communications system according to the present invention, showing data paths between the components.

The overall architecture of the ADCS according to the present invention is shown in somewhat greater detail and in block diagram form in FIG. 2. At premises 32 of subscriber 30, for example, an antenna 131 is installed for receiving a broadcast signal from transmission subsystem 20. The received signal is routed to an intelligent control box ("ICB") 130, which is also configured to receive input from all other available sources 100. ICB 130 is equipped to receive input from subscriber 30 and to transmit an appropriate signal, such as an NTSC, PAL, SECAM or other analog standard television signal, to television 34. ICB 130 may also be equipped to route signals to one or more additional televisions or other terminal devices, such as personal computers ("PCs")(not shown). ICB 130 may be coupled to a network interface unit ("NIU") 36 in order to communicate over a network. Alternatively, the functionality of NIU 36 could as easily be implemented by a device resident within ICB 130.

Also shown in FIG. 2 as connecting subscriber premises 32 with return path facility 50 by way of the PSTN 40 and telephone service provider facilities 45 is an optional path 42 via which return path facility 50 can send messages to ICB 130. Return path facility 50 receives via telephone service provider 45 messages not only from subscriber 30, as shown, but also from any number of subscribers (not shown in this view) reached by transmission subsystem 20, preferably by a high capacity link of sufficient bandwidth to simultaneously accommodate messages from a large number of subscribers.

I. Program subsystem

Figure 3:
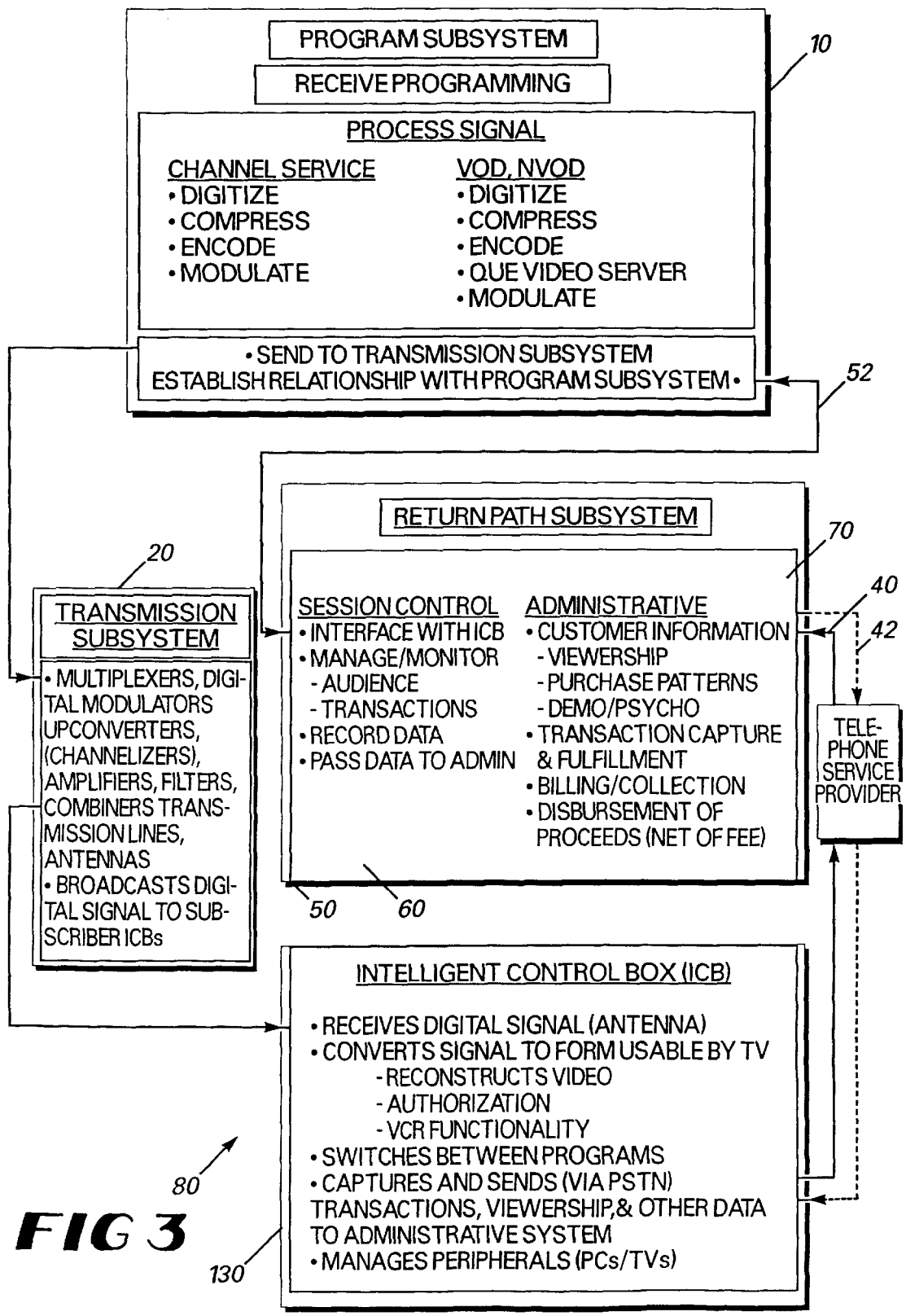
FIG. 3 is a block diagram showing the architecture and functions of the major components of an embodiment of an asymmetrical data communications system according to the present invention.
Figure 4:
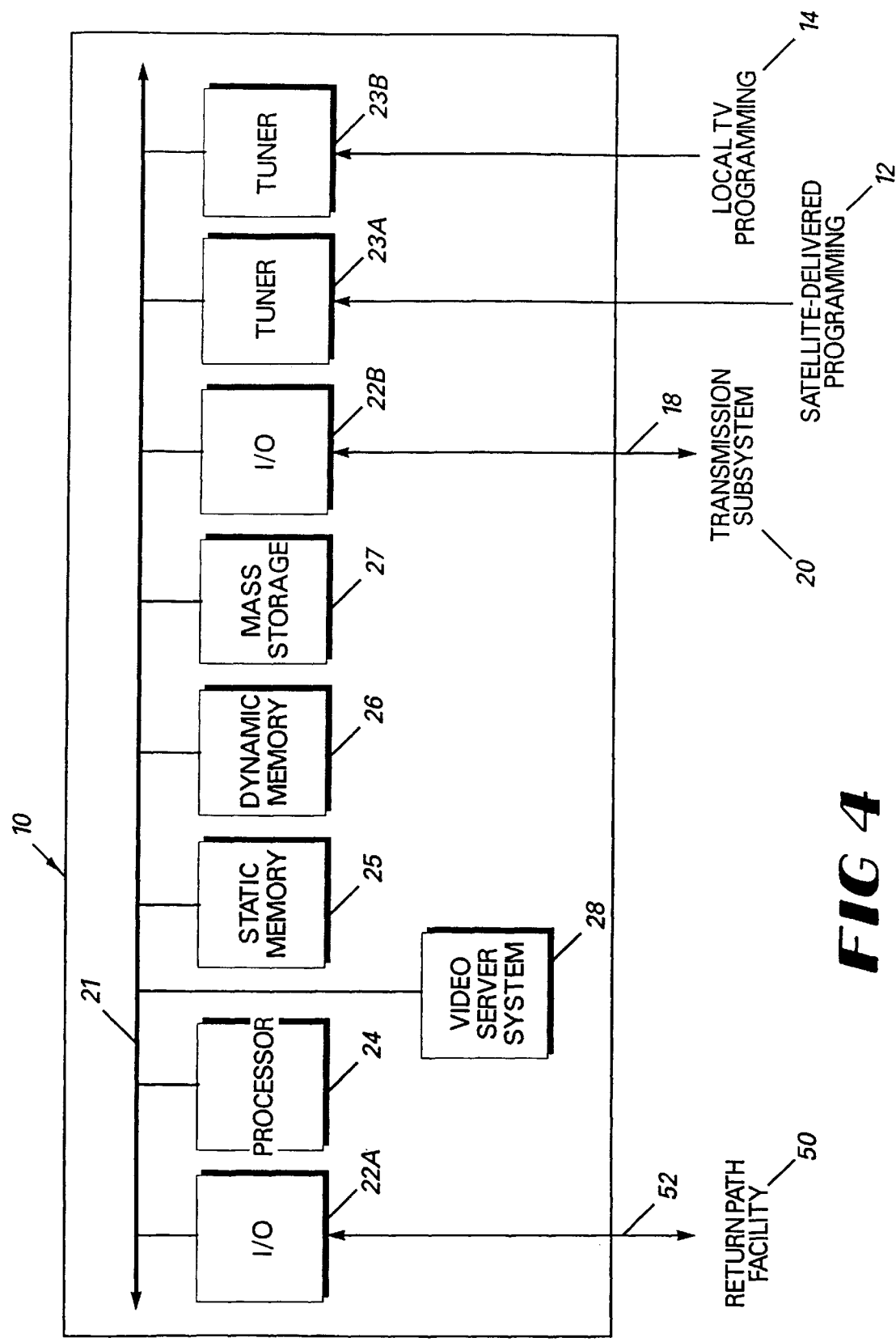
FIG. 4 is a component block diagram of a program subsystem of an embodiment of an asymmetrical data communications system according to the present invention.

As shown schematically in FIGS. 1 and 2 and functionally in FIG. 3, and as shown in still greater detail in FIG. 4, program subsystem 10 is equipped with conventional equipment to receive content via any suitable communications link from all programming and data sources. Programming and data from non-local content providers 12 can be received, for instance, via satellite (see FIG. 1) by tuner 23A, while programming from local TV content providers 14 could be received by tuner 23B from other transmission media, such as microwave or cable, and also by video tape, compact disc ("CD") delivered to the program subsystem. Among the variety of sources of content to which program subsystem 10 is preferably linked are video and audio entertainment programming, data services such as electronic catalogs, stock market quotations, sports scores and the like, electronic newspapers and other services, as well as other types of content that are as yet unavailable.

In addition to equipment for receiving the variety of content via various transmission paths, program subsystem 10 includes conventional video server means 28 for providing VoD and/or NVoD services, for example. With VoD and NVoD, a preselected set of films is delivered simultaneously, but out of phase (i.e., staggered) by a predetermined amount of time, in order to permit VCR-like functionality to subscribers 30, as discussed in greater detail below. For example, a selection of the 10 top films at any given time may be provided.

Program subsystem 10 tuners 23A and 23B and video server system 28 are coupled to program subsystem bus 21, on which the received data may be read and managed by one or more processors 24. Processor 24 can be implemented by a conventional device or set of devices having sufficient processing power to manage the receipt and suitable signal processing of content, as described, and also to manage the video server system 28. In carrying out its tasks, processor 24, by way of program subsystem bus 21, can read system software and other data from static memory 25, and can store and retrieve data in dynamic memory 26 and mass storage device or devices 27, all of which can be implemented with conventional technology.

Additional input to program subsystem 10 originates at return path facility 50 and is provided over link 52, which can be a broadband link or other link suitable for carrying a large volume of data. The data provided to program subsystem 10 by return path facility 50 includes, but is not limited to, requests for authorization for requested programming, such as pay-per-view, VoD, or NVoD. According to known techniques, the processor or processors of program subsystem 10 includes functionality for receiving requests for pre-stored authorization codes corresponding to the subscribers and for incorporating one or more codes into the broadcast signal in order to enable a requesting subscriber to receive an encrypted program, as will be further described below. Input received over link 52, in the form of authorization requests or messages, is demodulated or otherwise processed as necessary by I/O device 22A, and is provided on program subsystem bus 21 for processing, management and storage by processor 24. Messages can be sent by program subsystem 10 via I/O device 22A back to return path facility 50 as necessary, such as to acknowledge an authorization request or to provide information for use in managing the ADCS.

Referring again to FIG. 2, the primary functionality of the program subsystem 10 is shown. Incoming channel service, VoD or NVoD sources, and all other input content are received according to known methods. The received programming and content are then processed to produce a signal that can be provided via link 18 to transmitter subsystem 20 in a form suitable for physical transmission. The processing performed by program subsystem 10 applies known methods to achieve a maximum transmission rate and a minimal probability of transmission errors, while keeping to a minimum the amount of transmitter power required, and the RF bandwidth required.

The available bandwidth for transmission is likely to be driven in part by the regulatory environment, as well as by the availability (or lack of availability) of suitable UHF channels in a given market. Under the present regulatory framework, channels are defined in 6 MHz RF bands. The UHF spectrum, defined as the 470–806 MHz band, is divided into 56 such 6 MHz channels, which are identified by convention as numbers 14 to 69. The UHF band has been used to provide television service for decades, thus transmission equipment is available from a variety of vendors.

Propagation of signals in the UHF spectrum is generally line-of-sight, and thus limited by obstructions in the path between the transmitter and a receiver, such as mountains and the curvature of the earth. However, the presence of these obstructions can lead to the diffraction of UHF signals and thus to a certain degree of circumvention of the obstacles. Signals in the UHF spectrum also reflect off certain obstructions, which tends to divide the energy in the signals into fractions that propagate to a given receiver over more than one path. Such multipath propagation can lead to fractions of a UHF signal arriving at a receiver at slightly different times, causing a phenomenon known as "ghosting," in which one or more phantom images trail a primary image on the television screen. Ghosting can be addressed through channel equalization techniques.

Transmission of a large number of component signals in a single-to-multipoint UHF transmission poses a number of technical and regulatory problems. Present FCC allocation rules, for example, grant RF spectrum rights to one use or user exclusive of others and in such a manner as to be protected from interference. Co-channel interference is addressed by enforcing a mileage separation of broadcast facilities to hold the desired to undesired signal ratio (D/U) to a predetermined level.

Digital transmission is less susceptible to co-channel interference. Nevertheless, it is expected that existing NTSC (or PAL, SECAM or other analog television standard) channels will be protected to the extent presently required for a number of years.

In addition to co-channel protection, UHF signals are protected by rules designed to limit interference between adjacent channels. These rules, known as "UHF taboos," constrain the D/U between immediately adjacent channel signals to be −6 dB or greater, require separation of transmitter sites by a predetermined distance to address interference introduced by local oscillator radiation, require separation of image frequencies associated with the visual and sound carriers, and preclude use of the second through fifth adjacent channels to combat intermodulation distortion. The UHF taboos are set forth in 47 C.F.R. § 73.699 (Table II)(incorporated herein by reference).

In order to support the delivery of the maximum number of programming channels, as well as a desirable number of films available for VoD or NVoD delivery, and permitting this service to be as close as possible to "VCR functionality," it is desirable to substantially reduce the bandwidth necessary for the delivery of adequate service. Several approaches may be used.

In one embodiment of the system and method according to the present invention, the resolution of the programming is purposely selected to be equivalent to that available from video home system (VHS) video tapes or other publicly acceptable medium having resolution lower than is associated with conventionally broadcast television signals. The resolution of VHS-quality video is approximately 256 by 240 pixels. Since video consumers appear comfortable with this resolution, transmission by the ADCS program and transmission subsystems would appear to be efficient yet unobjectionable at that degree of resolution.

In another embodiment, a data compression scheme is used, for example, MPEG2 compression (Moving Pictures Expert Group standard 2, an international video and audio compression and transmission standard described in ISO/IEC CD 13818-1, the contents of which are incorporated by reference herein) or any other suitable standard, format, protocol, data structure, sequence or organization scheme for reducing the bandwidth required for transmission. Assuming video stream(s) encoded at 3 Mbps, the number of such digital video streams available in a 6 MHz channel can be computed according to the following relation:

$$R = B \cdot \log_2(N) \cdot U$$

where
R=bit rate;
B=channel bandwidth;
N=signalling (or quantizing) level of modulation;
U=payload useability (to take into account forward error correction);

| Quantizing Level N | $\log_2(N)$ | 3/4 Payload | Bandwidth | Bit Rate | Number of Video Streams |
|---|---|---|---|---|---|
| 2 | 1 | 0.75 | 6 | 4.5 | 1 |
| 4 | 2 | 0.75 | 6 | 9 | 3 |
| 8 | 3 | 0.75 | 6 | 13.5 | 4 |
| 16 | 4 | 0.75 | 6 | 18 | 6 |
| 32 | 5 | 0.75 | 6 | 22.5 | 7 |
| 64 | 6 | 0.75 | 6 | 27 | 9 |
| 128 | 7 | 0.75 | 6 | 31.5 | 10 |
| 256 | 8 | 0.75 | 6 | 36 | 12 |

The foregoing relation applies to any video encoding/compression scheme and the results in the table apply for any video streams encoded at 3 Mbps per video stream.

Figure 5:
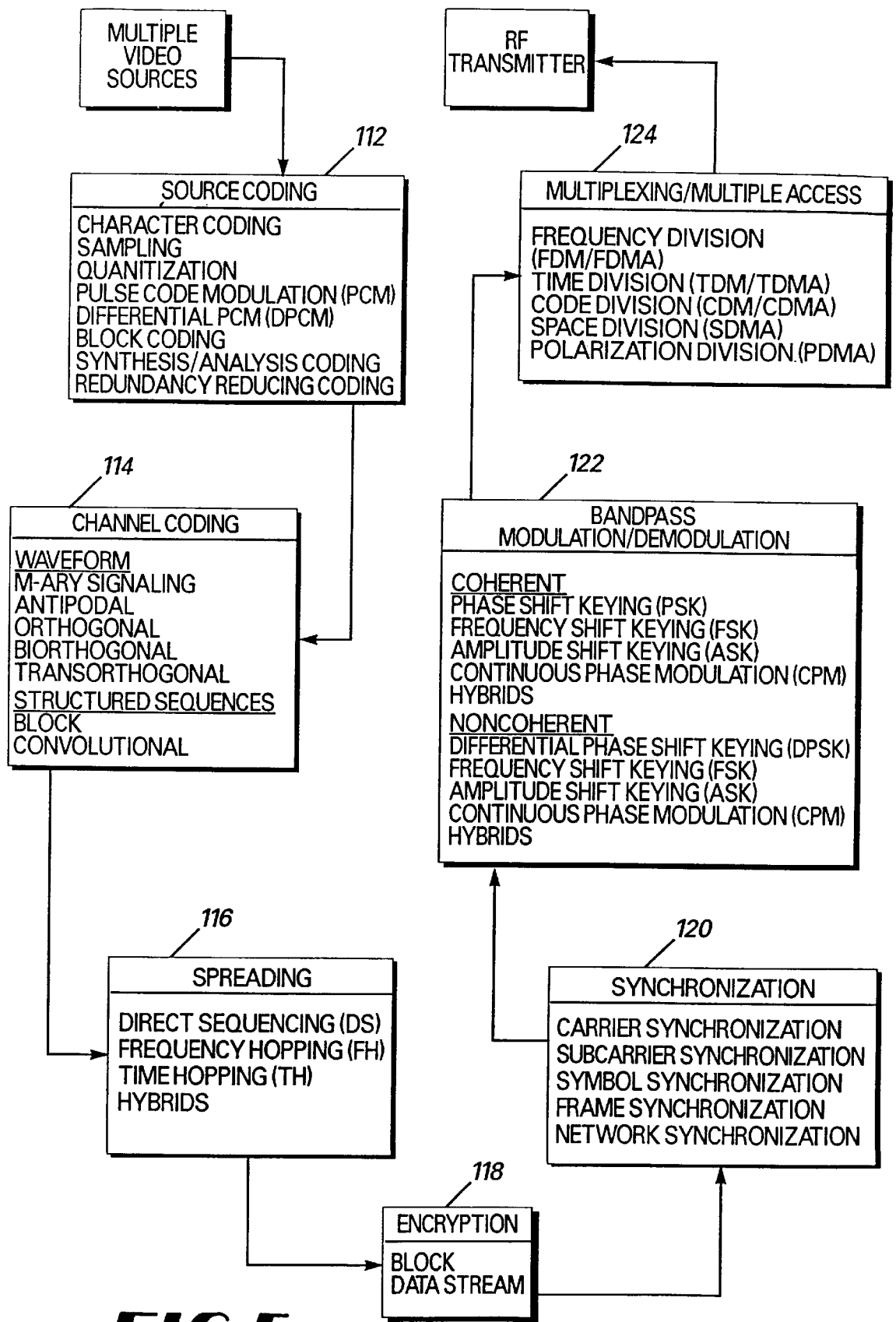
FIG. 5 is a block diagram showing the signal processing steps of multiple video sources performed in the program subsystem and/or transmission subsystem of an embodiment of an asymmetrical data communications system according to the present invention, and indicating alternative suitable techniques for performing each step.

The quantizing level and the efficiency with which the video streams are encoded are functions of available technology. In general, programming that will be provided as channel service is digitized, suitably compressed, encoded and modulated according to known techniques, some alternatives for which are shown in FIG. 5. To begin with, the multiple video sources received by program subsystem 10 may each be source coded 112 (or "compressed") if possible in order to reduce the bandwidth needed for transmitting them. Suitable source coding techniques that may be used include character coding, sampling, quantization, pulse code modulation (PCM), differential PCM (DPCM), block coding, and synthesis/analysis coding. Another class of source coding or compression techniques, known as redundancy reducing coding, reduces the volume of data required to transmit a signal by eliminating redundancy in the signal, as well as information that would rejected rather than processed by a viewer because of psychobiological limitations on human perception. For example, a typical scene in a video contains much information that does not change from frame to frame. Transmitting only the changes in the scene permits a significant reduction in the volume of data transmission without any loss of information to the viewer. Another form of source coding or compression takes advantage of the psychobiological phenomenon that the human eye is less capable of resolving colored images than black and white images, permitting a commensurate reduction in the amount of data to be transmitted without a detectable loss of resolution.

Well-known compression techniques may be used. For example, but without limitation, the MPEG-1 (Motion Picture Experts Group of the International Standards organization (ISO)), or MPEG-2 standard would offer the possibility of "scalable" resolution, and which is currently being implemented in the form of a commercially available integrated circuit chip. However, any other suitable compression technique could also be used. Using MPEG-1 merely as an example, a compression ratio on the order of 100:1 can be achieved. Accounting for imperfections in transmission, the effective bandwidth required for a video stream can accordingly be reduced to the order of 0.08 MHz, implying a theoretical upper limit of 72 VHS-quality video streams per 6 MHz channel according to the current spectrum allocation.

Suitable transmission efficiencies may be achieved with currently available channel coding methods, such as 16-QAM (quadrature amplitude modulation), 4-VSB (vestigial sideband), 1-PSK (phase-shift keying) or OFDM (orthogonal frequency division multiplexing). The second processing step for the incoming video streams is channel coding 114, which can be used to reduce required bandwidth and the presence of transmission errors. Channel coding includes waveform coding, such as M-ary signalling, and antipodal, orthogonal, biorthogonal and transorthogonal coding. Channel coding also can include structured sequence coding, for example using block codes or convolutional codes. Both block codes and convolutional codes are directed to minimizing the bit error ratio (BER) via forward error correction (FEC). BER is one of the most important quality factors observed in evaluating digital transmission systems. FEC techniques are intended to reduce residual BER by several orders of magnitude and also to increase system gain by encoding the bit stream prior to modulation. The coding involves adding extra bits to the bit stream according to specific rules; thus, they intentionally add a certain amount of redundancy. Using the foregoing techniques, reliability can be traded off against efficiency to achieve suitable system performance.

After the incoming signal has been suitably source coded and channel coded, the compressed multiple video sources may be further processed using spreading or spread spectrum techniques 116, such as direct sequencing (DS), frequency hopping (FH), time hopping (TH) and hybrids of these techniques. Spread spectrum techniques improve a signal's interference resistance and thus bandwidth efficiency characteristics by distributing the transmitted power over a bandwidth sufficiently wide to ensure that the power per unit bandwidth is kept very small.

Spread spectrum signals are difficult for a casual listener to intercept, but true security requires encryption. In order to protect them against unintended reception, the multiple video source signals are encrypted 118 according to known methods, such as block and data stream encryption techniques.

The digital multiple video source signals, having been compressed, channel coded and spread, are also synchronized 120 and modulated 122 according to known methods, some of which methods are listed, without limitation, in FIG. 5.

Finally, the compressed, channel coded, spread, encrypted, synchronized and modulated multiple video source signal is multiplexed 124 according to known techniques listed at reference numeral 124 of FIG. 5, including, without limitation, frequency division multiplexing, time division multiplexing, code division multiplexing, space division multiplexing and polarization division multiplexing. The fully processed, modulated and multiplexed signal is provided, as shown in FIGS. 1 and 2, over link 18 to transmitting site 20.

The techniques referred to in the schematic of FIG. 5 and the accompanying description, are illustrative but not exhaustive of the techniques that could be used to practice the present invention. Other known techniques may also be used, and their choice, as well as chosen parameters, may depend not only on designer preferences but on design constraints imposed by the setting of the transmitter, the chosen equipment, and other factors. Moreover, the processing associated with these techniques could be performed in program subsystem 10, as described above, but could alternatively be done, at least in part, at transmission subsystem 20 as shown in FIG. 6 and described in the text accompanying that figure.

The VoD or NVoD functionality of the program subsystem may also be implemented according to known methods. VoD service is widely understood to mean that a desired video program can be viewed within 5 minutes after it has been selected. Preferably, a user can exercise virtual control over the transmission by pausing, rewinding, fast forwarding or other function as one would do with a conventional video cassette player. In order to achieve this functionality, for example with a two-hour long film, it would be necessary for twenty four simultaneous video streams to be transmitted, one beginning anew every five minutes. Fast forwarding, rewinding and pausing are thus achieved by tuning to the appropriate time-shifted channel. The program subsystem 10 would receive a request for authorization from a subscriber 30, as further described in connection with FIG. 9, and would transmit this authorization, for example in a vertical blanking interval of a preselected channel. The authorization would be received by the ICB 130 of the requesting subscriber 30 and thereby enable receipt and viewing of the appropriately time-shifted channel. Providing 10 film offerings of two-hour duration with 5 minute VoD functionality would require 240 simultaneous video streams. Provided that 8 video streams can be reliably transmitted in a single 6 MHz RF channel, 30 RF channels will be required for this VoD function, the availability of which channels will depend on the market, as well as the state of applicable federal regulations. To facilitate the provision of VoD, relaxing the delay from 5 to 10 minutes, thus being closer to NVoD, would reduce by half the required total bandwidth to 15 RF channels.

II. Transmission Subsystem

Figure 6:
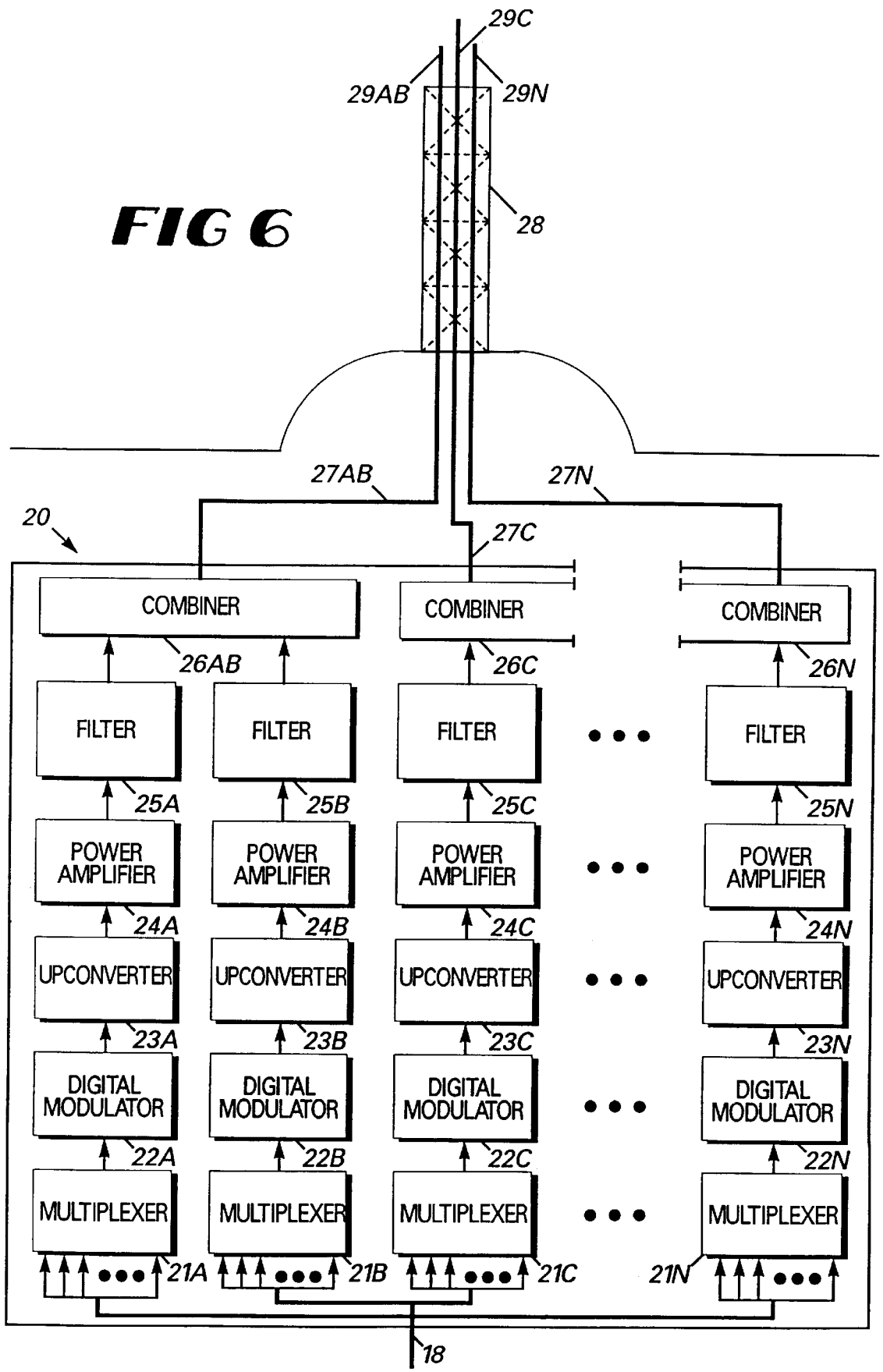
FIG. 6 is a block and partially schematic diagram showing the transmission subsystem of an embodiment of an asymmetrical data communications system according to the present invention.

Transmission subsystem 20 is shown in detail in FIG. 6. Although the multiplexing and modulation of signals has been described above in connection with program subsystem 10, that functionality, or some of it, could alternatively be provided at transmission subsystem 20, as shown in FIG. 6. If the functionality were provided in the program subsystem 10, it could accordingly be excluded from transmission subsystem 20. As shown herein, however, transmission line 18, which may include a plurality of separate lines, delivers the entirety of the programming content from program subsystem 10 to transmission subsystem 20. Subsets of the programming content may be input to multiplexers 21A, 21B, 21C, ..., 21N, where they are multiplexed according to known methods, as described in connection with box 124 of FIG. 5. The multiplexed signals output from multiplexers 21A, 21B, 21C, ..., 21N are then digitally modulated at 22A, 22B, 22C, ..., 22N, respectively, according to conventional modulation techniques. Each multiplexed, modulated signal is then upconverted to RF frequency by a corresponding upconverter 23A, 23B, ..., 23N, which may be implemented by conventional equipment. Output from upconverters 23A–23N is then amplified by power amplifiers 24A, 24B, 24C, ..., 24N, respectively. Each power amplifier 24A–24N, which may be conventional equipment, should be capable of generating a peak output sufficient for appropriate radiated RF energy to allow proper reception of equivalent NTSC (or PAL, SECAM or other analog television standard) transmission. Output from each power amplifier 24A–24N is filtered by one or more filters 25A, 25B, 25C, ..., 25N, each filter being of a conventionally available sort and sufficiently sized to accommodate the power of the output of the corresponding amplifier 24A–24N, to reduce spurious signals to acceptable levels. In an alternative embodiment, the number of sets of transmitting equipment could be reduced by further multiplexing a set of signals prior to modulation, upconversion and amplification.

The output signals from the filters 25A–25N are applied to combiners, which may be conventionally available equipment. For example, output from filters 25A and 25B are combined by combiner 26AB, while output from filter 25C and perhaps other filters are fed to combiner 26C, and output from filters including filter 25N are input into combiner 26N. The output of each combiner 26AB, 26C, ..., 26N is applied, if necessary, to corresponding transmission lines 27AB, 27C, ..., 27N, respectively. Since the transmission lines may be required to transmit several high-powered signals, conventional coaxial transmission lines may not be useable. In such cases, transmission lines are preferably waveguides of large diameter (e.g., 18 inches in diameter). Waveguide size is driven by the lowest frequency to be carried, while the highest frequency that can be carried by the same waveguide is limited by the transmission efficiency, which may be about 10% above the lowest channel frequency. Since the UHF television band straddles 470–806 Mhz, as many as five different waveguides would be needed to support transmission across that band, although for convenient illustration, three are shown.

Portions of waveguide transmission lines 27AB, 27C and 27N are supported by at least one transmission tower 28 having a suitable height above the ground, while taking into account the relative altitude of its base. For example, transmission tower 28 could be 1000 feet high or more, if required. Each of the waveguide transmission lines 27AB, 27C and 27N is coupled to a corresponding antenna 29AB, 29C and 29N, respectively. These antennas are also supported by transmission tower 28, which must be sufficiently strong to bear them along with the waveguide transmission lines 27AB, 27C and 27N, and should accordingly be fabricated with sufficient strength according to known methods. Preferably, at least three antennas should be used in order to support transmission across the entire UHF band. As with transmission lines, antenna efficiencies are frequency-dependent. The height of transmission tower 28 should ensure sufficient vertical aperture of antennas 29AB, 29C and 29N. As an alternative to a large single structure, several smaller supporting structures could be used (not shown). The transmission subsystem 20 can be expected to generate a high level of non-ionizing radiation, which, depending upon the height at which the antenna(s) are actually mounted, may require that its site be located most preferably at an appreciable physical distance from human populations.

As described above, known components can be used in transmission subsystem 20, preferably of a type suitable at least for use with high definition television (HDTV).

III. Return Path Subsystem

Broadcasts by the transmission subsystem 20 are received by subscribers who are within the broadcast pattern of the transmission subsystem 20 and who at their premises 32 have a proper receiving device. According to the present invention, the receiving device is a component of a piece of equipment having a number of functions, and which is referred to as an ICB (intelligent control box) 130.

Along with the return path facility 50 to which it is linked by a telecommunications system, such as PSTN lines 40 (or a suitable wireless alternative, not shown) and switching and other facilities operated and maintained by public telephone services provider 45, the ICB 130 constitutes a portion of the return path subsystem 80 of the described embodiment of the system according to the present invention. The use of the PSTN lines 40 between the portions of the return path subsystem 80 takes advantage of the realization that the timing and information content of communications by humans differ enormously from those of the broadcast path, perhaps on the order of $10^9$. Information sent upstream by a subscriber 30, moreover, would tend to be sporadic rather than continuous. The second portion of the return path, return path facility 50, implements two types of functionality: switching and accounting system 60 and external transaction system 70, each of which will be described below.

A. Intelligent Control Box (ICB)

ICB 130 forms that portion of the return path subsystem 80 of the system according to the present invention that resides at the premises of subscriber 30 and receives the digital UHF broadcast from the transmission subsystem 20. In addition to this role, ICB 130 also provides subscribers 30 with a variety of additional capabilities and functions.

Figure 7:
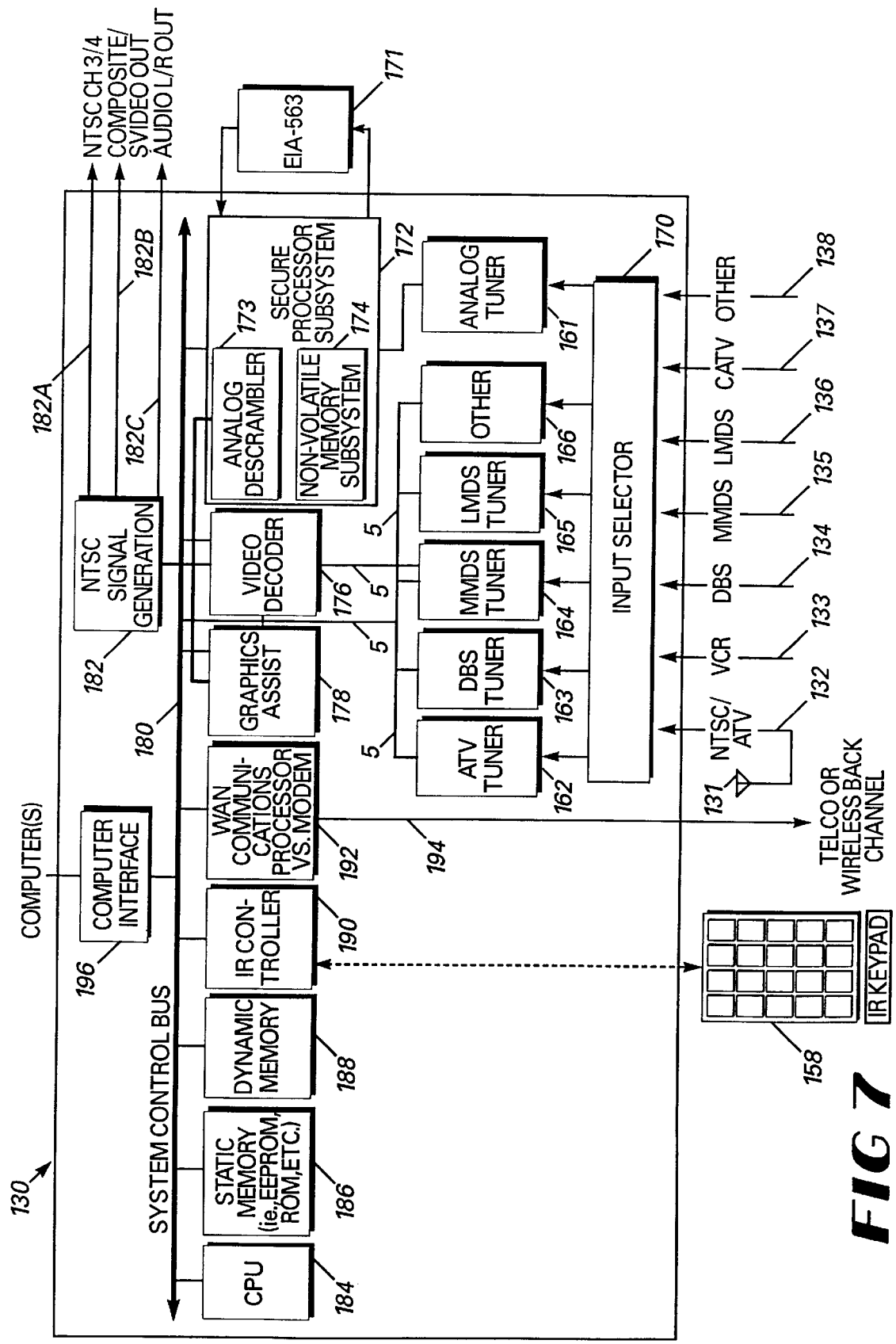
FIG. 7 is a component block diagram of an ICB of an embodiment of an asymmetrical data communications system according to the present invention.

The architecture for an embodiment of ICB 130 according to the present invention is shown in FIG. 7. ICB 130 acts as a matrix switch (i.e., an electronic gatekeeper) to provide an interface between the ADCS, the full variety of other programming sources, and the viewer's television monitor, computer, or other peripheral devices. In addition to over-the-air UHF ADCS broadcast, ICB 130 is provided with input ports to receive signals from any number of available sources. ICB 130 can accept input from an antenna 132, which can carry NTSC signals as well as digitized UHF signals transmitted by transmission subsystem 20. According to the present invention, ICB 130 can also accept input from any number of non-ADCS inbound program sources, such as from a VCR 133, from a DBS provider 134, from an MMDS provider 135, from an LMDS provider 136, or from a CATV provider 137. Input from any other available source, including a mass storage or other device, as well as any presently existing or future transmission type, may be received by ICB 130, as denoted by the input port identified as "other" 138, which may be adapted or retrofitted to receive an appropriate connector as necessary.

All program inputs received by ICB 130 are transmitted to input selector (matrix switch) 170, which can be any available hardware for switching between a plurality of signals, most preferably under the control of a conventional or custom processor. Input selector 170 is coupled to system control bus 180 of ICB 130 by way of which it can receive switching signals from CPU 184 in order to execute the selection commands of subscriber 30, as further discussed below.

ICB 130 may include a tuner for each input type. Signals switched by input selector 170 are each provided to an appropriate tuner. A selected over-air-air NTSC signal received via antenna 131, for example, can be tuned by analog tuner 161, as can a selected CATV signal received at port 137. In an alternative embodiment, one or more additional analog tuners could be provided for simultaneously receiving two analog signals, if it is desired to route two such signals to different televisions, computers or other devices, to provide a picture-in-picture (PIP) display, or to support other functionality.

Signals on input 132, such as the digital UHF signal transmitted by transmission subsystem 20 according to the present invention are received by ATV tuner 162, which can be a conventionally available digital tuner and demodulator. DBS input arriving at port 134, if selected and accordingly switched by input selector 170, can be received by tuner 163, while MMDS signals entering at port 135 and switched by input selector 170 are received by MMDS tuner 164. Similarly, LMDS signals arriving at 136 and switched by input selector 170 can be tuned by LMDS tuner 165. All of the foregoing tuners may be implemented by any commercially available devices for receiving the respective signals. Moreover, the foregoing-tuners are illustrative rather than exhaustive; signals requiring tuning that cannot be done by way of the foregoing tuning devices, such as signals according to as yet unconceived schemes, can be received by a suitable associated tuning device or devices represented by box 166 with which ICB 130 can be retrofitted as desired. Subscriber 30 thus does not have to collect, operate and maintain a set of devices from various vendors each of which provides only a single purpose solution.

The output from analog tuner 161 (and any additional analog tuners that may optionally be included in ICB 130) may be transmitted to secure processor subsystem 172. Secure processor subsystem 172 may be any known system for receiving scrambled or otherwise secured signals over a private distribution system. Typically, the secured processor subsystem 172, its components, and their functionality are compatible with encryption techniques of the sort employed in program subsystem 10, illustrated, for example, at block 118 of FIG. 5. Secure processor subsystem 172 includes a conventional analog descrambler 173 for descrambling signals received and forwarded by analog tuner 161. Secure processor subsystem 172 (or other processor means described below) is programmed to detect one or more authorization codes included in received transmissions and only to descramble a particular transmission on detection of such code or codes. Secure processor subsystem 172 may include a non-volatile memory subsystem 174 for storing information necessary for decoding received transmissions, including normal cable program transmissions, pay-per-view program transmissions and the like.

In order to interface televisions or other viewing devices accepting a baseband input with a decoding device (for example, a CATV decoder, not shown), secure processor subsystem 174 is optionally coupled to EIA-563 standard baseband interface, the baseband output of which it can provide to baseband-equipped televisions or other devices over line 182B.

Turning to the digital signals received by ICB 130, each tuner among the set of tuners 162–166, demodulates signals it is tuned to receive in order to reconstruct the desired analog signal. The resulting signal from each tuner is transmitted by a dedicated line (here shown in a bundle of such lines denoted in FIG. 7 using the notation "/5") to video decoder 176, a conventionally available device for interpreting an input stream according to a preselected technique compatible with the method used for compressing the video signal at the program subsystem 10, for example. Video decoder 176 thereby recovers the compressed signal to produce a video signal. An analog channel received for example by analog tuner 161 and selected by input selector 170 may be routed via secure subprocessor system 172 directly to NTSC signal generation module 182. Digital signals received by tuners 162–166 may also be provided on dedicated lines (shown in bundled form using the notation "/5") to system control bus 180, via which it could be provided, as one illustrative example, via computer interface 196 to a computer or other device.

Analog descrambler 172 and video decoder 176 are both coupled to graphics assist module 178. Graphics assist module 178 can be any conventional graphics processor suitable for adding a desired graphics overlay onto the video signals received from the video decoder 176 and/or the analog descrambler 172 in response to instructions implemented by software running on CPU 184 and provided over system control bus 180. The functionality of graphics assist module 178 could alternatively be implemented by CPU 184, if it were suitably programmed and capable of sufficient throughput. As will be further described below, graphics assist module 178 generates a video signal overlaid on the existing television signal providing, in response to instructions received over system bus 180. For example, a menu of viewing options, information regarding the ordering of a VoD or NVoD video, or any other information regarding subscriber transactions may be overlaid on the screen. Graphics assist module 178 may generate a menu, a button image, or a logo or other pattern or symbol, and inject the image into the video stream such that the image appears in a designated portion of the screen. Information used in generating the screen images, as described below, may be available in received signals or may use information stored in the ICB 130, for example, pre-loaded in static memory 186.

The video stream emerging from analog descrambler 173 or video decoder 176, and from graphics assist module 178, is provided to NTSC signal generation module 182. As an alternative to NTSC, signal generation module 182 could generate signals according to any available and desired video format. NTSC signal generation module 182 includes conventional circuitry for transforming the output of analog descrambler 172, video decoder 176 and graphics assist module 178 into a standard form usable by a conventional television or monitor (not shown in this view). This functionality could, alternatively, convert input signals to any suitable standard format. As shown in FIG. 7, NTSC signal generation module 182 generates a set of coordinated signals and provides them to one or more terminal devices (not shown) adapted to receive and display television signals, including without limitation one or more televisions or personal computers. Output from NTSC signal generation module 182 to the one or more terminal devices includes an NTSC video stream 182A on channel 3 and/or 4, a composite/Svideo Out signal 182B (which may also carry baseband signals routed through EIA-563 171), and left and right audio signals 182C. The signal provided by ICB 130 could be any signal deriving in whole or in part from received input and be in any desired form. Even more generally, CPU 184 can issue instructions to manage televisions, computers, or other terminal or peripheral devices without limitation, for example, via computer interface 196, which can be any suitable conventional device, coupled to system control bus 180.

In addition to the previously described components and functionality, which have to do with the receipt and provision of television signals, possibly with inserted graphics, ICB 130 includes a number of additional components for implementing other functions. The processing associated with managing and controlling the functions of the ICB 130 is performed by CPU 184. CPU 184 may be any suitable commercially available processor, and preferably one capable of performing in excess of 30 Mips, such as a POWER PC® or PENTIUM® integrated circuit (IC) chip, programmed to process the incoming digitized UHF signal according to known methods, as well as selecting and processing the remainder of the input provided at ports 134, 138, 140, 144 and 145, when chosen by subscriber 30. Alternatively, CPU 184 could be a custom chip or chip set for carrying out the same set of functions. In running system software stored in static memory 186 (which may be an EEPROM, ROM or the like), CPU 184 has access via system control bus 180 to static memory 186 and to dynamic memory 188, which may be conventionally available memory, preferably with a storage capacity of at least about 4–5 MB. CPU 184 also has access via system control bus 180 to information regarding the current channel, to the graphics assist module 178 regarding graphical display signals, and to video decoder 176 and input selector 170, as well as to secure processing subsystem 172, and the tuners 161–166, in order to assert appropriate command messages to those components.

Interaction by subscriber 30 with ICB 130 may be by any suitable means, but is preferably by conventional infrared (IR) remote control, as in the described embodiment. Input controller 190 receives signals from subscriber-controlled remote control input device 158 via an IR receiver and associated circuitry (not shown). Using input device 158 (or any other suitable input means), subscriber 30 may issue to the ICB 130 instructions to switch between programs, to request VoD or NVoD services via the return path facility 50, to control the delivery of such requested services with VCR functionality, to purchase items offered for sale on shopping channels, or to provide any desired input originating with subscriber 30. Instructions received by input controller 190 may be asserted via system control bus 180 as commands to input selector 170 and tuners 161–166, to secure processor subsystem 172, as well as to video decoder 176, and graphics assist module 178. Input controller 190 can also send messages to CPU 184 when, for example, subscriber 30 requests an interactive program or other service.

Interaction by the ICB 130 with return path facility 50 via PSTN lines 40 and telephone service provider 45 is conducted by CPU 184 through WAN communications processor and modem 192. WAN communications processor and modem 192 can be any conventional device suitable for converting messages received via system control bus 180 into a WAN-compatible protocol, such as IP (internet protocol), and modulating the converted message signals received from WAN communications processor for transmission over the PSTN lines 40 and via switching and other facilities maintained and operated by a telephone service provider 45 (as shown in FIGS. 1–3).

In addition to the primary function of delivering television programming to subscriber 30, or management instructions to one or more terminal devices such as televisions or computing devices, CPU 184 operating according to software residing in static memory 186, for example, and using known methods, implements an authorization function enabling subscribers (and only subscribers) of particular services, to be able to view programming associated with those services. CPU 184 is also programmed to capture and send via telecommunication connection 194 to return path facility 50 subscriber requests for transactions input via remote control system 158, as well as data regarding viewership and other observable events.

B. Return Path Facility

Figure 8:
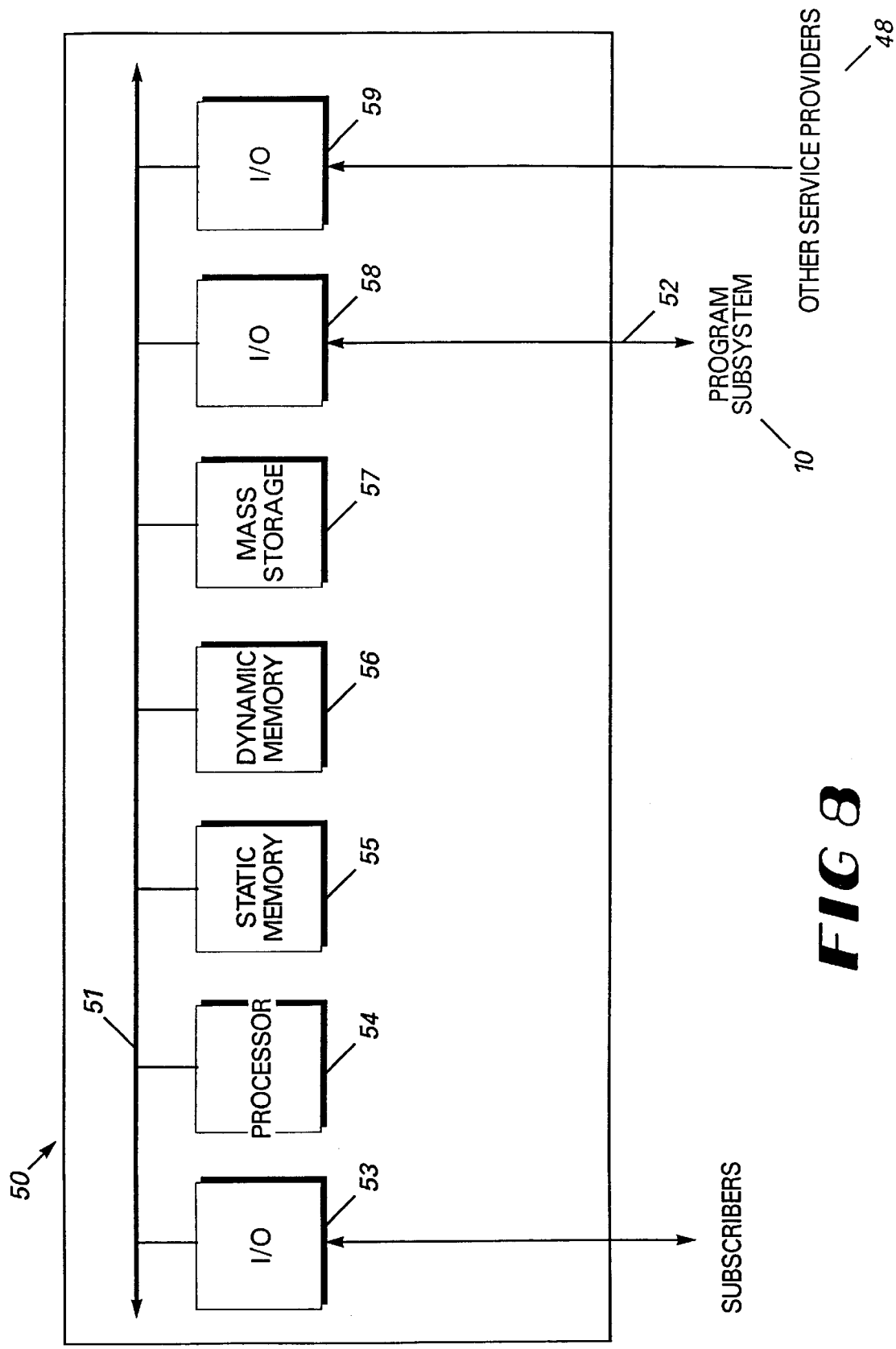
FIG. 8 is a component block diagram of a return path facility of an embodiment of an asymmetrical data communications system according to the present invention.

A second portion of the return path subsystem 80 is a return path facility 50. Return path facility 50 is shown in FIGS. 1–3 in schematic form, illustrating the functionality of that component of the system according to the present invention. Referring to FIG. 8, return path facility is shown in greater detail.

In brief, return path facility 50 provides an external transaction system for facilitating viewing requests, purchases and other transactions by subscriber 30 executed from the premises via the ADCS according to the present invention, system, and also for facilitating fulfillment of the viewing, purchase, or other request, including taking an order, processing the order, establishing delivery of the item requested or purchased, conducting billing for the transaction or purchase, and sharing of the proceeds with the seller. In addition, return path facility 50 also may capture viewing and purchase pattern information for subsequent compilation by a market analysis center to determine types of content most valuable to each individual customer. This process facilitates the transmission of targeted advertising messages that can trigger interactions for more information or a transaction.

The return path subsystem 50 is ultimately adaptable from an ADCS to a symmetrical data communications system when the PSTN or other non-broadcast return path has sufficient available bandwidth to accommodate full video delivery. Return path facility 50 includes conventional processing means 54, which can be one or more commercially available processors and which is coupled via a return path facility bus 51 to at least one static memory device 55, at least one dynamic memory device 56, and which may also be coupled to at least one mass storage device 57. These memory devices can all be implemented with commercially available hardware.

Two way communications between return path facility 50 and subscribers, such as illustrative subscriber 30, can be maintained over a public telephone or other transmission line or lines via I/O device 53, which can be any conventional device suitable for modulating and demodulating input and output in a manner consistent with the transmission line. Since the return path subsystem 50 is responsible for receiving request messages, demographics and other information from all of the subscribers within the signal range of transmission subsystem 20, the transmission line or lines are preferably of capacity sufficient to handle this traffic.

According to functionality described at greater length below, return path subsystem 50 sends messages, such as authorization requests, to program subsystem 10 via I/O device 58 on return path subsystem bus 51. Optionally, messages such as demographic, billing or other transaction data can also be sent to other service providers 48 via I/O device 59 on return path subsystem bus 51. I/O devices 58 and 59 can be implemented by any conventional equipment suitable for this purpose.

As shown in FIG. 3, the functionality of return path subsystem 50 includes two main modules: session control module 60 and administrative module 70. Processing associated with both modules is performed by processor 54 according to software that may be pre-stored in static memory 55, and utilizing dynamic memory 56 and mass storage 57 as necessary. In the illustrated embodiment, but without limitation, session control module 60 of return path facility 50 is responsible for maintaining an interface with each ICB 130 that has initiated a session. Requests for programming or other transactions are managed and monitored, as are audience observations provided by ICB 130 according to a desired, predetermined approach. Session control module 60 also includes the recording of desired aspects of messages and transactions in mass storage device 57. Also, transaction requests, demographic or other marketing data, or other received messages are forwarded for processing by administrative module 70.

Administrative module 70 captures the occurrence of requested transactions for purposes of billing, recording viewing patterns, and for fulfilling the requested transaction by transmitting appropriate requests as necessary over link 52 to program subsystem 10. Requests for other sorts of transactions, such as purchasing offerings on home shopping channels or any other transaction may be accounted for and then provided to the appropriate one of a set of other service providers 48 with which the operator of the ADCS has established a relationship. Administrative module 70 also gathers customer information regarding customer viewership, purchasing patterns, and demographic or psychological information important for marketing and stores this information as necessary and/or provides it to one or more of the other service providers 48 according to a predetermined arrangement. Such information gathering may be done, for example, but without limitation, pursuant to agreements with subscribers permitting the gathering of such information, possibly with a reduction in subscription rate or some other consideration to the subscriber. Administrative module 70 of return path subsystem 50 according to a predetermined scheme can also keep track of viewing and transaction requests for one or more other service providers 48, and can use this information to conduct billing on behalf of those providers 48.

IV. Operation of the ADCS System According to the Present Invention

Figure 9:
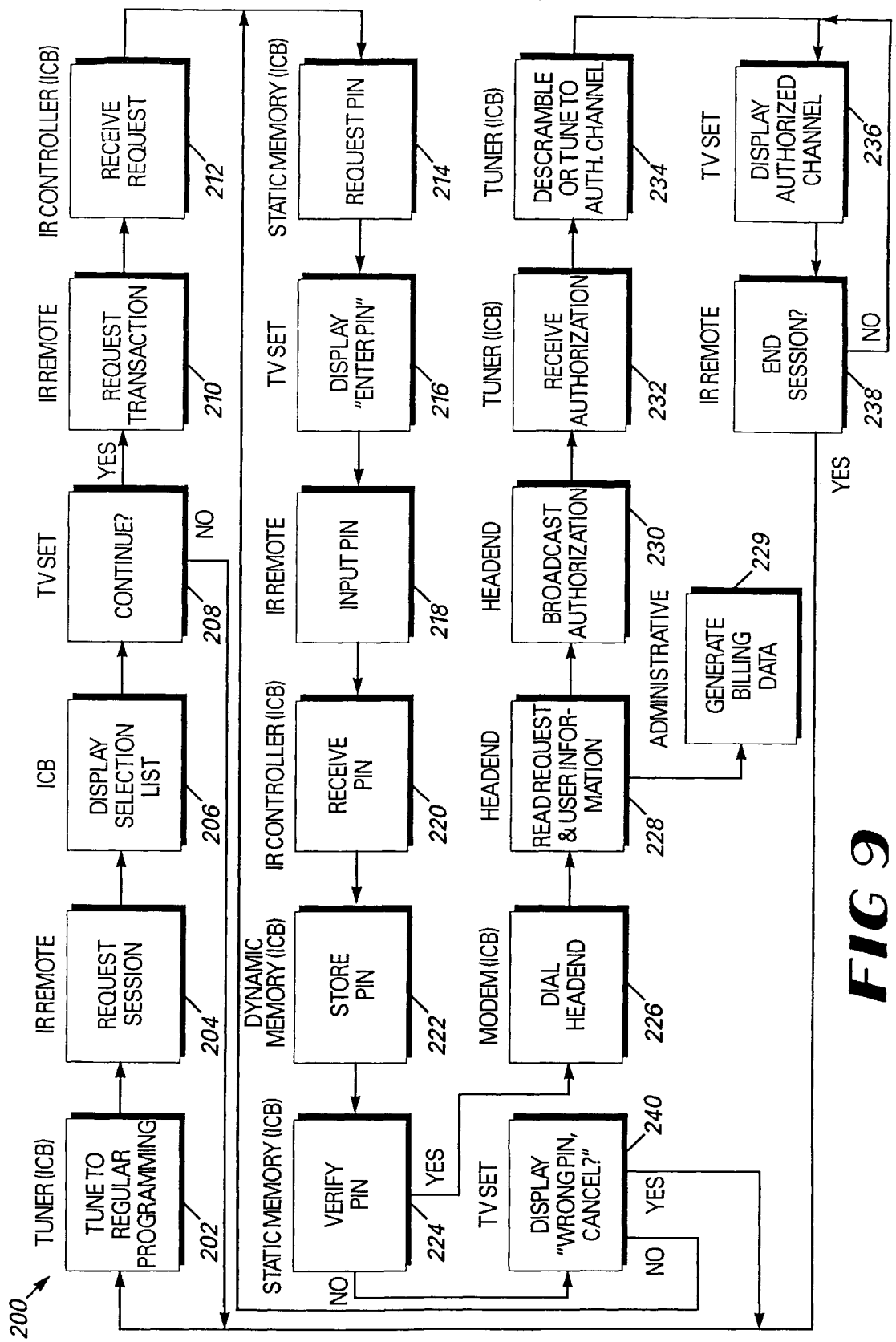
FIG. 9 is a logic flow diagram for a representative operation of the ICB and return path facility of an asymmetrical data communications system according to the present invention.

A logic flow diagram for processing associated with a representative transaction performed by an embodiment of an ADCS according to the present invention is shown in FIG. 9. In particular, subscriber 30 via ICB 130 initiates a request for a particular program requiring authorization, and the ensuing processing or activity by the ICB 130, the return path subsystem 50, program subsystem 10, and transmission subsystem 20 are described. On the top edge of each box is indicated the subsystem of the ADCS responsible for performing the indicated function.

Process 200 begins at step 202, at which the ICB 130 tuner (i.e., the input selector 170) is tuned to regular programming selected by subscriber 30, which may be a default setting that could be either factory set or determined by subscriber 30. Using the IR remote 158, the user may request a viewing session, at 204. CPU 184 of ICB 130 retrieves from static memory 186 (or other storage not shown in FIG. 7) pre-stored code for a viewing selection list and performs any necessary processing. Then, via system control bus 180 and, if necessary, video decoder 176 and graphics assist 178, the pre-stored selection list code is processed by NTSC signal generation module 182 and provided over line 182A to a terminal device, such as television set 34, at step 208.

If subscriber 30 expresses no interest in a transaction, process 200 simply returns to the beginning, step 202. If subscriber 30 requests a transaction however at 210 (using IR remote 158) and IR controller 190 receives the request, at 212, the CPU 184 of ICB 130 retrieves from static memory 186 a pre-stored request for a personal identification number (PIN), which it then causes to be displayed on television set 34 as, for example, the character string "Enter PIN." The subscriber 30, having been prompted by the message, via IR remote 158 enters his or her PIN, which is received by IR controller 190 and stored by CPU 184 in dynamic memory 188. The CPU 184 of ICB 130 according to instructions it retrieves from static memory 186 initiates a procedure to verify the PIN, at 224.

If the PIN is not verified, CPU 184 causes to be displayed on television set 34 the legend "Wrong PIN, Cancel?", or other legend to the same effect, and waits for a response from subscriber 30. If subscriber 30 responds in the negative, process 200 returns to step 214, in which the PIN is again requested (a memory or input error presumably having been made by subscriber 30). If subscriber 30 responds in the affirmative, process 200 simply returns to initial step 202.

If, on the other hand, the PIN was verified at step 224, then CPU 184 invokes WAN communications processor and modem 192, CPU 184 dials return path subsystem 50 (which might also be referred to as "head end", as it is in FIG. 9). Processor 54 of return path subsystem 50 establishes a session with ICB 130 and reads subscriber 30's request, PIN, and other desired subscriber information. Processor 54 of return path subsystem 50, invoking the administrative module 70, generates billing data associated with this request.

For purposes of this logic flow, "headend" is also, for convenience, intended to include functionality implemented by program subsystem 10. At step 230, the processor 54 of return path subsystem 50 generates and transmits to program subsystem 10 a message that subscriber 30 is authorized for a particular selected viewing choice. An authorization code, which may have been pre-stored at return path facility 50 and retrieved for program subsystem 10, or which could alternatively have been pre-stored in program subsystem 10, is then included in the transmission by program subsystem 10 to transmission subsystem 20 and is thus broadcast, for example in the vertical blanking interval of a particular video stream. The authorization code is inserted into a video stream being transmitted in a frequency band to which ICB 130 is programmed to tune to look for this information. Accordingly, the authorization code is identified in that band by the ICB 130 and extracted according to known methods, at step 232, for use in enabling the decoding of the selected transmission, or tuning to an authorized channel, step 234.

CPU 184 of ICB 130 then ensures that the ATV tuner 162 is tuned to the appropriate band, if necessary, that the input selector 170 is switching the transmission from the ATV tuner 162 through to the video decoder 176, and that the video decoder 176 has the necessary authorization for descrambling the authorized transmission. At 238 the subscriber 30 may end the session using IR remote 158, either at the end of the program, or for any other reason. If subscriber 30 during the course of the transmission does not indicate that he or she wishes to terminate the session, CPU 184 continues to cause the authorized channel to be displayed on television set 34. During this period, other functionality could be represented, including VCR functionality or other subscriber interaction. If, on the other hand, subscriber 30 does end the session, or if it terminates on its own, process 200 in that case returns to initial step 202.

The foregoing describes a preferred embodiment of the present invention. Various changes and modifications to what is disclosed may be adopted or implemented without departing from the scope or spirit of the invention.

What is claimed is:

1. A system for communicating content to a plurality of subscribers, the content carried by signals originating from a plurality of content providers, the system for communicating content comprising:
   a plurality of receivers, each receiver for receiving at least one of the content-containing signals transmitted by one of the plurality of content providers;
   means for digitizing the signals received from the plurality of content providers, the digitizing means coupled to the receiving means for receiving the signals;
   means for compressing the digitized signals, the compression means coupled to the digitizing means for receiving the digitized signals;
   a multiplexer coupled to the compression means for multiplexing the digitized signals into at least one digital data stream;
   modulating means coupled to the multiplexer for modulating the at least one multiplexed digital data stream;
   RF upconverter means coupled to the multiplexing means for channelizing the at least one multiplexed digital data stream into the UHF frequency band;
   an amplifier coupled to the RF upconverter means for amplifying the at least one UHF multiplexed digital data stream; and
   an antenna coupled to the amplifier for transmitting the at least one amplified UHF multiplexed digital data stream;
   whereby an aggregation of programming sources may be provided point-to-multipoint to a plurality of subscribers by way of digital UHF broadcast.

2. The communications system according to claim 1, wherein at least one of the signals from the content providers is transmitted via satellite and the at least one receiver includes means for receiving signals transmitted via satellite.

3. The communications system according to claim 2, wherein a second of the plurality of received signals is provided via cable, and at least one of the plurality of receivers is adapted to receive cable transmissions.

4. The communications system according to claim 3, wherein a third of the plurality of received signals is provided via microwave transmission, and wherein at least one of the plurality of receivers includes a receiver adapted to receive microwave transmissions.

5. The communications system according to claim 4, wherein a fourth of the plurality of received signals is transmitted optically via optical fiber, and wherein at least one of the plurality of receivers includes a receiver adapted to receive optical transmissions.

6. The communications system according to claim 1, wherein the received signal comprises video data, and wherein the at least one compression means is adapted to compress the digitized signal to a resolution of approximately 256 by 240 pixels.

7. A system for communicating with a plurality of subscribers, the communication involving content carried by signals originating from a plurality of content providers, at least one of the plurality of subscribers having access to a telecommunications system, the system for communication comprising:
   a program subsystem, including:
   a. a plurality of receivers, each receiver for receiving one of the plurality content-carrying signals;
   b. processing means coupled to the plurality of receivers and adapted for:
      i. digitizing the signals from the plurality of content providers;
      ii. inserting desired information into the digitized signals;
      iii. compressing the digitized signals; and
      iv. multiplexing the digitized signals into at least one data stream;
   c. means for modulating the at least one digital data stream, the modulating means coupled to the processing means;
   d. RF upconverter means coupled to the modulating means for channelizing the at least one modulated digital data stream into the UHF frequency band;
   e. at least one amplifier coupled to the RF upconverter means for amplifying the at least one modulated digital signal;
   f. at least one antenna coupled to the at least one amplifier for transmitting the at least one amplified data stream; and
   a return path subsystem coupled to the program subsystem and to the telecommunications system, the return path subsystem including processing means adapted for receiving over the telecommunications system communications from the subscribers and communicating with the program subsystem information to be inserted by the program subsystem into the received, digitized signals;
   whereby an aggregation of programming sources may be provided point-to-multipoint to subscribers by way of digital UHF broadcast, subscriber input regarding the broadcast can be received, and program transmissions may be modified in response to the subscriber input.

8. A system for communicating with a plurality of subscribers, the communication involving content carried by signals originating from a plurality of content providers, at least one of the plurality of subscribers having access to a telecommunications system, the system for communication comprising:
   a. a program subsystem, including:
      i. a plurality of receivers, each receiver for receiving one of the plurality content-carrying signals;
      ii. processing means adapted for modifying the received signals, the processing means coupled to the plurality of receivers;
   b. a transmission subsystem coupled to the program subsystem and receiving from the program subsystem the received signals, the transmission subsystem including:

i. means for digitizing the signals from the plurality of content providers;
ii. means for compressing the digitized signals, the compression means coupled to the digitizing means;
iii. a multiplexer, for multiplexing the digitized signals into at least one data stream, the multiplexer coupled to the compression means;
iv. means for modulating the at least one digital data stream into the UHF frequency band, coupled to the multiplexing means;
v. RF upconverter means coupled to the modulating means for channelizing the at least one modulated multiplexed digital data stream into the UHF frequency band;
vi. at least one amplifier coupled to the RF upconverter means for amplifying the at least one modulated digital data stream; and
vii. at least one antenna for transmitting the at least one amplified, channelized, modulated, digital data stream; and c. a return path subsystem coupled to the program subsystem and to the telecommunications system, including processing means adapted for receiving over the telecommunications system communications from the subscribers;

whereby an aggregation of programming sources may be provided point-to-multipoint to subscribers by way of digital UHF broadcast and subscriber input regarding the broadcast can be taken into account by the communications system.

9. The communications system according to claim 8, wherein the processing means of the return path subsystem is further adapted to communicate with the program subsystem on receiving a communication from a subscriber, and the processing means of the program subsystem is further adapted to modify the received signals on receiving a communication from the return path subsystem, whereby the transmission may be modified in response to a subscriber request.

10. The communication system according to claim 9, wherein the received signals include a plurality of programs, the subscriber request relates to of the plurality of programs, and the modification of the received signals by the program subsystem in response to subscriber requests is the inclusion of an authorization code in the transmission, the authorization code corresponding to the subscriber request for a particular program.

11. The communications system according to claim 8, wherein the program subsystem further comprises a video server system, the video server system including at least one video server and adapted to play at least one of a preselected set of videos, the return path processor means being further adapted to receive requests for transmission of one of the preselected set of videos and to transmit to the program subsystem a message regarding authorization for transmission to the subscriber of the one preselected video, and the program subsystem processing means being further adapted to include in the transmission an authorization code corresponding to the subscriber and to the selected video.

12. The communications system according to claim 8, wherein the return path subsystem further comprises data storage means, and wherein the return path subsystem processing means is further adapted to create a record corresponding to communications received from subscribers and to store that record in the data storage means.

13. The communications system according to claim 12, wherein the record corresponding to communications received from subscribers contains billing information.

14. The communications system according to claim 12, wherein the record corresponding to communications received from subscribers contains subscriber preference information derived from the subscriber communications.

15. A system for communicating content with a plurality of subscribers, the content originating from a plurality of content providers and transmitted by each content provider via receivable signals, at least one of the plurality of subscribers having access to a telecommunications system, the system for communicating content comprising:

a. a program subsystem, including:
  i. a plurality of receivers, each receiver for receiving one of the plurality of signals, each signal from one of the plurality of content providers;
  ii. processing means adapted for modifying the received signals, the processing means coupled to the plurality of receivers;

b. a transmission subsystem, including:
  i. at least one means for digitizing the signals from the plurality of content providers coupled to the receiving means;
  ii. at least one means for compressing the digitized signals, coupled to the digitizing means;
  iii. at least one multiplexer, for mulitplexing the digitized signals into at least one data stream, coupled to the compression means;
  iv. means for modulating the at least one digital data stream, coupled to the multiplexing means;
  v. RF upconverting means coupled to the modulating means for channelizing the at least one modulated multiplexed digital into the UHF band;
  vi. at least one amplifier coupled to the RF upconverting means for amplifying the at least one modulated, channelized, multiplexed digital signal; and
  vii. at least one antenna coupled to the at least one amplifier for transmitting the at least one amplified, channelized, modulated, digital signal;

c. a return path facility coupled to the program subsystem and to the telecommunications system, including processing means adapted for receiving over the telecommunications system communications from the subscribers;

d. a plurality of intelligent control boxes, each intelligent control box at a subscriber's premises, coupled to the telecommunications system, and including:
  i. a tuner for receiving transmissions from the transmission subsystem;
  ii. an input device for accepting subscriber requests; and
  iii. a processor coupled to the tuner and to the input device and adapted to assert subscriber requests at the return path facility via the telecommunications system;

whereby an aggregation of programming sources may be provided point-to-multipoint by way of digital UHF broadcast, a plurality of subscribers can assert requests in connection with the broadcast, and the return path facility can fulfill the requests.

16. A system for communicating with a plurality of subscribers, the communication involving content carried by signals originating from a plurality of content providers, at least one of the plurality of subscribers having access to a telecommunications system, the system for communication comprising:

a. a program subsystem, including,
  i. a plurality of receivers, each receiver for receiving at least one of the plurality of content carrying signals;

ii. processing means adapted for modifying the received signals, the processing means coupled to the plurality of receivers;

b. a transmission subsystem coupled to the program subsystem and receiving from the program subsystem the received signals, the transmission subsystem including:

i. means for digitizing the signals from the plurality of content providers;

ii. means for compressing the digitized signals, the compression means coupled to the digitizing means;

iii. a multiplexer, for multiplexing the digitized signals into at least one data stream, the multiplexer coupled to the compression means;

iv. means for modulating the at least one digital data stream into a radio frequency band, coupled to the multiplexing means;

v. RF upconverter means coupled to the modulating means for channelizing the at least one modulated multiplexed digital data stream into the radio frequency band;

vi. at least one amplifier coupled to the RF upconverter means for amplifying the at least one modulated digital data stream; and vii. at least one antenna for transmitting the at least one amplified, channelized, modulated, digital data stream; and c. a return path subsystem coupled to the program subsystem and to the telecommunications system, including processing means adapted for receiving over the telecommunications system communications from the subscribers;

whereby an aggregation of programming sources may be provided point to multipoint to subscribers by way of digital broadcast and subscriber input regarding the broadcast can be taken into account by the communications system.

17. The communications system according to claim 16, wherein the processing means of the return path subsystem is further adapted to communicate with the program subsystem on receiving a communication from a subscriber, and the processing means of the program subsystem is further adapted to modify the received signals on receiving a communication from the return path subsystem, whereby the transmission may be modified in response to a subscriber request.

18. The communications system according to claim 16, wherein the return path subsystem further comprises data storage means, and wherein the return path subsystem processing means is further adapted to create a record corresponding to communications received from subscribers and to store that record in the data storage means.

19. A device for permitting a subscriber to interact with an asymmetrical data communications system, the device coupled and the asymmetrical data communications system both coupled to a telecommunications system, the device having a plurality of ports each for receiving one of a plurality of signals, comprising:

a. an input selector coupled to the plurality of ports and adapted for switching signals arriving at the plurality of ports according to a subscriber selection;

b. a plurality of receivers coupled to the input selector each for receiving a selected signal switched by the selector, the plurality of receivers including:

i. a tuner for receiving digital RF transmissions in the UHF band; and ii. a tuner for receiving analog RF signals; and c. a video decoder coupled to the digital tuner;

d. signal generation means coupled to the video decoder;

e. an input device for subscriber information input;

f. a processor coupled to the input selector and the video decoder adapted for reading subscriber input information and actuating the input selector to effect subscriber requests; and g. a network interface coupled to the processor and to the telecommunications system for transmitting subscriber messages to the asymmetrical data communications system.

20. The device of claim 19, wherein the plurality of receivers further comprises a DBS tuner coupled to the input selector.

21. The device of claim 19, wherein the plurality of receivers further comprises an MMDS tuner coupled to the input selector.

22. The device of claim 19, wherein the plurality of receivers further comprises an LMDS tuner coupled to the input selector.

23. The device of claim 20, wherein the plurality of receivers further comprises an MMDS tuner coupled to the input selector.

24. The device of claim 20, wherein the plurality of receivers further comprises an LMDS tuner coupled to the input selector.

25. The device of claim 21, wherein the plurality of receivers further comprises an LMDS tuner coupled to the input selector.

26. The device of claim 23, wherein the plurality of receivers further comprises an LMDS tuner coupled to the input selector.

27. The device of claim 19 further comprising a secure processor subsystem coupled to the analog tuner for descrambling analog input signals that require descrambling.

28. The device of claim 27 further comprising an EIA-563 baseband interface coupled to the secure processor subsystem.

29. A method for providing asymmetric data communications services, comprising the steps of:

a. receiving signals from a plurality of content providers;

b. digitizing the signals from the plurality of content providers;

c. multiplexing the signals from the plurality of content providers into at least one data stream;

d. modulating the at least one multiplexed, digital data stream;

e. channelizing the at least one modulated, multiplexed digital data stream into at least one digital RF signal;

f. transmitting the at least one digital RF signal to a plurality of subscribers each having a device for receiving and demodulating the at least one RF signal;

g. receiving over the PSTN a message from at least one subscriber receiving device; and h. retransmitting to other service providers each of the at least one messages from the at least one subscriber receiving device.

30. The method of claim 29 wherein the at least one modulated, multiplexed digital data stream is channelized into at least one digital UHF signal.

31. The method of claim 29 wherein the resolution of the service is approximately 256 by 240 pixels.

* * * * *

(12) EX PARTE REEXAMINATION CERTIFICATE (8728th)

United States Patent
Arias et al.

(10) Number: US 6,118,976 C1
(45) Certificate Issued: Dec. 6, 2011

(54) ASYMMETRIC DATA COMMUNICATIONS SYSTEM

(75) Inventors: Salvador Luis Arias, Chamblee, GA (US); Edward Irby Comer, Marietta, GA (US); Roy Curtis Dunn, Douglasville, GA (US); Melvin Duane Frerking, Norcross, GA (US); Fred Thomas Danner, III, Alpharetta, GA (US); Richard Sammis Bergen, Jr., Roswell, GA (US); Sidney Walker Elliott, Atlanta, GA (US); Thomas Franklin Evans, Stone Mountain, GA (US); Craig Brent Chambers, Stockbridge, GA (US)

(73) Assignee: AT&T Intellectual Property I, L.P., Atlanta, GA (US)

Reexamination Request:
No. 90/011,370, Dec. 4, 2010
No. 90/011,428, Jan. 10, 2011

Reexamination Certificate for:
Patent No.: 6,118,976
Issued: Sep. 12, 2000
Appl. No.: 08/994,531
Filed: Dec. 19, 1997

Related U.S. Application Data

(63) Continuation of application No. 08/447,537, filed on May 24, 1995, now abandoned.

(51) Int. Cl.
*H04N 7/173* (2006.01)

(52) U.S. Cl. ............... 725/118; 348/E7.069; 348/E7.07; 348/E7.071; 348/E7.073; 725/101; 725/87

(58) Field of Classification Search ................. None
See application file for complete search history.

(56) References Cited

To view the complete listing of prior art documents cited during the proceedings for Reexamination Control Numbers 90/011,370 and 90/011,428, please refer to the USPTO's public Patent Application Information Retrieval (PAIR) system under the Display References tab.

*Primary Examiner* — Ovidio Escalante

(57) ABSTRACT

An asymmetrical data communications system (ADCS) provides point-to-multipoint television programming including conventional television programming, near video-on-demand (NVoD) or video-on-demand (VoD), and the full variety of available programming, via a compressed, digitized UHF transmission. A program subsystem of the ADCS receives programming from content providers and processes the received signals for channel and VoD or NVoD service, then sends the aggregated signal to a transmission subsystem that modulates, channelizes, amplifies, filters and broadcasts the digital UHF signals over the air. Subscribing viewers are equipped with an intelligent control box (ICB) suitably configured to receive, demodulate, and decode the digital UHF broadcast and to transmit the resulting signal to one or more display or other terminal devices. The ICB further provides a matrix switch or gateway for receiving signals over any available transmission path. In addition to the ICBs of the subscribing viewers, a return path subsystem of the ADCS system includes a session control and administrative facility to which the ICBs are linked via the public switched telephone network or suitable wireless alternative so that transaction and viewing data can be received from the subscribing viewers. The return path subsystem, in turn, is linked to the program subsystem in order to route to that subsystem any information necessary or useful for providing programming.

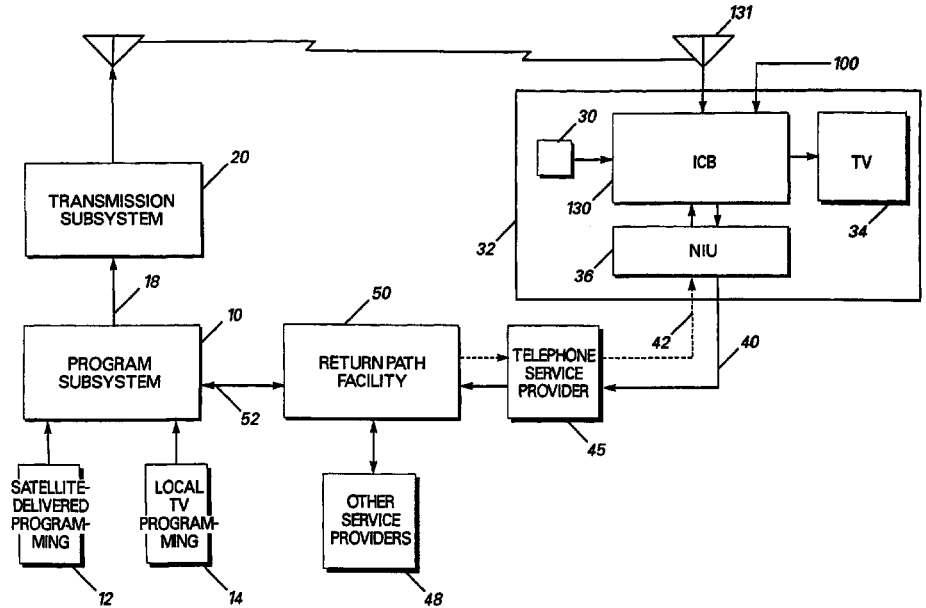

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 19 and 27 is confirmed.

New claims 32-52 are added and determined to be patentable.

Claims 1-18, 20-26 and 28-31 were not reexamined.

*32. The device of claim 19, wherein the plurality of signals include at least one video on demand program, and wherein the subscriber input information includes subscriber instructions to pause, fast forward, and rewind the at least one video on demand program.*

*33. The device of claim 32, wherein the subscriber messages transmitted via the network interface include a request for the at least one video on demand program.*

*34. The device of claim 32, wherein the subscriber messages transmitted via the network interface include the subscriber instructions to pause, fast forward and rewind the at least one video on demand program.*

*35. The device of claim 32, wherein the subscriber messages transmitted via the network interface facilitate billing for a video on demand transaction.*

*36. The device of claim 19, wherein the subscriber messages transmitted via the network interface include a request for at least one video on demand program, and wherein the network interface delivers the at least one video on demand program via a non-broadcast return path to the device.*

*37. The device of claim 36, wherein the subscriber messages transmitted via the network interface include subscriber instructions to pause, fast forward and rewind the at least one video on demand program.*

*38. The device of claim 36, wherein the network interface operates in accordance with an internet protocol.*

*39. The device of claim 36, wherein the subscriber messages transmitted via the network interface facilitate billing for a video on demand transaction.*

*40. The device of claim 36, wherein the subscriber input information includes an access code, and wherein the subscriber messages transmitted via the network interface include the access code.*

*41. The device of claim 19, wherein the subscriber messages transmitted via the network interface include an order corresponding to an item for purchase.*

*42. The device of claim 41, wherein the subscriber messages transmitted via the network interface facilitate billing for the order.*

*43. The device of claim 41, wherein the subscriber messages transmitted via the network interface facilitate delivery of the item for purchase.*

*44. The device of claim 41, wherein the subscriber input information includes an access code, and wherein the subscriber messages transmitted via the network interface include the access code.*

*45. The device of claim 19, wherein the subscriber messages are transmitted via the network interface to a service provider and include an order corresponding to an item for purchase for transmittal from the service provider to a seller of the item for purchase.*

*46. The device of claim 19, wherein the network interface communicates with a service provider to capture viewing pattern information associated with the device.*

*47. The device of claim 19, wherein the network interface communicates with a service provider to capture viewing pattern information associated with the device that is associated with demographic information for provision to others.*

*48. The device of claim 19, wherein the plurality of signals include at least two of:*

*a digital UHF broadcast signal received via an antenna;*

*a satellite broadcast signal;*

*a cable television signal;*

*a signal from a video game; and*

*a signal from a video player.*

*49. The device of claim 19, wherein the subscriber input information includes subscriber instructions to access programs stored on a mass storage device.*

*50. The device of claim 19, wherein the network interface interfaces to a broadband digital subscriber line.*

*51. The device of claim 19, wherein the network interface interfaces to a wireless data network to communicate data bidirectionally with a service provider via an internet protocol.*

*52. The device of claim 19, wherein the signal generation means generates a signal that is configured for and output to at least one of a television, computer, monitor, and terminal device.*

\* \* \* \* \*